(12) United States Patent
Nakao et al.

(10) Patent No.: US 6,866,831 B2
(45) Date of Patent: Mar. 15, 2005

(54) REACTION AND STIRRING APPARATUS, REACTION AND SEPARATING FILTRATION APPARATUS AND SEPARATING METHOD, GENERATION METHOD, AND FILTRATION METHOD

(75) Inventors: Shin-ichi Nakao, Tokyo (JP); Toru Taniguchi, Miyazaki (JP)

(73) Assignee: Reika Kogyo Kabushiki Kaisha, Kiyotake-cho (JP)

( * ) Notice: Subject to any disclaimer, the term of this patent is extended or adjusted under 35 U.S.C. 154(b) by 917 days.

(21) Appl. No.: 09/737,763

(22) Filed: Dec. 18, 2000

(65) Prior Publication Data

US 2001/0004975 A1 Jun. 28, 2001

(30) Foreign Application Priority Data

Dec. 22, 1999 (JP) ............................................. 11-364193
Dec. 5, 2000 (JP) ........................................ 2000-369801

(51) Int. Cl.⁷ ................................................. F28D 2/00
(52) U.S. Cl. ....................... 422/205; 422/224; 422/225; 210/413
(58) Field of Search ................................. 422/205, 224, 422/225; 210/413

(56) References Cited

U.S. PATENT DOCUMENTS 2,692,854 A * 10/1954 Henley ........................ 210/415

FOREIGN PATENT DOCUMENTS

JP A 2000-51673 2/2000

* cited by examiner

Primary Examiner—William Cheung
(74) Attorney, Agent, or Firm—Oliff & Berridge, PLC

(57) ABSTRACT

In an apparatus 10, a space is formed by a pair of impermeable supports 16 and a pair of spacer members 12 for providing a predetermined distance between the impermeable supports 16. A permeable membrane is provided within the space and outlets 15 are provided on each of the pair of impermeable members 16. A stirrer 20 is provided within the space where the permeating object is present, and comprises a stirring axis 22, a driving source for oscillating the stirring axis 22, and a plurality of stirring blades 24 mounted on the stirring axis 22. Cut sections 26 are provided at a portion of each of the stirring blades 24 so that the permeating object can be circulated at the space between the stirring blade 24 and the inner wall of the spacer member 12 or at the space between the stirring blade 24 and the permeable membrane 14. The cut sections are alternately provided at the right and left sides of the layered stirring blades.

36 Claims, 29 Drawing Sheets

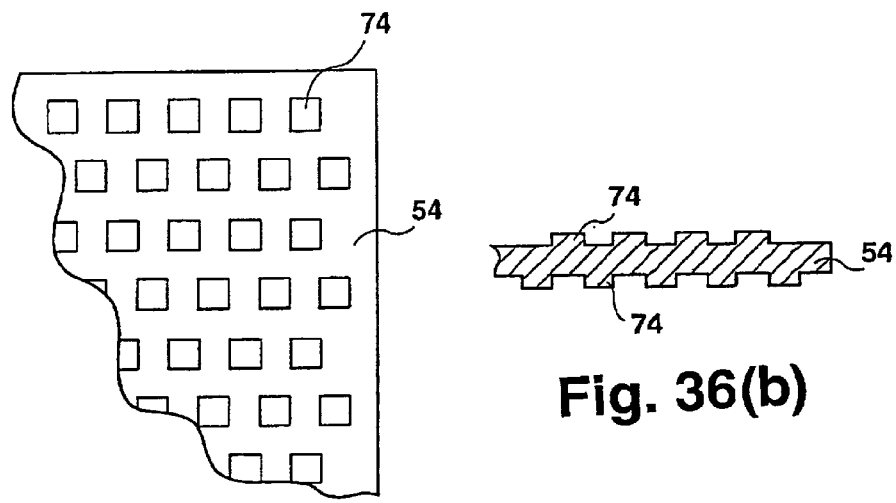
Fig. 36(a)
Fig. 36(b)
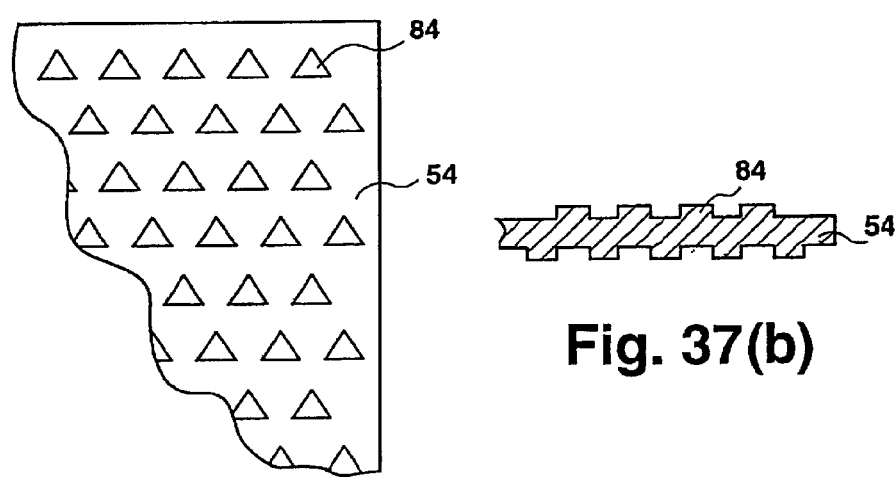
Fig. 37(a)
Fig. 37(b)

REACTION AND STIRRING APPARATUS, REACTION AND SEPARATING FILTRATION APPARATUS AND SEPARATING METHOD, GENERATION METHOD, AND FILTRATION METHOD

BACKGROUND OF THE INVENTION

1. Field of the Invention

The present invention relates to a reaction and separating filtration apparatus and to a method using such an apparatus. In particular, the present invention relates to an apparatus and method in which a desired product can be distinguished and collected using a permeable membrane or a filtration membrane while oscillation stirring.

2. Description of the Related Art

As a filtration apparatus for performing ultrafiltration (UF) or reverse osmosis filtration (RO), an apparatus proposed by the present inventor is known (refer to Japanese Patent Application No. Hei 10-262225) which has the structure shown in FIGS. 31, 32(A), and 32(B). In such a filtration apparatus, a pair of impermeable spacer members 3 are provided at both end sections of a pair of supports 1a and 1b which are constructed from an impermeable member so that the spacer members are pinched in between. A membrane-type filtration medium 4 is provided in the space defined by these impermeable members. The sample to be filtered (filtration object) is introduced into the space surrounded by the filtration medium, and by applying a pressure to the space or by reducing the external pressure via the filtration medium, the filtration object is permeated through the filtration medium 4 and the filtrate is taken out from an outlet 5.

Moreover, filtration medium 4 is also provided respectively along the inner walls of the supports 1a and 1b, and a stirrer 2 is provided in parallel with the two filtration media. The stirrer 2 comprises a stirring axis 2a and ladder 2b mounted on the stirring axis 2a. When the stirrer oscillates in the vertical direction between the filtration media 4, formation of a boundary film and a cake layer near the inner wall of the filtration media 4 is inhibited, and, thus, reduction in filtration efficiency can be prevented.

When the target to be isolated within the original fluid is transported near the membrane by the permeation flux at the membrane and blocked by the membrane, it accumulates near the membrane surface, resulting in an increase in the relative concentration at the membrane surface with respect to the concentration within the original fluid itself (this phenomenon is known as a concentration polarization) and formation of a "boundary film" at the membrane surface. Because the filtration resistance is increased by the boundary film, it is known that the filtration efficiency is generally reduced.

The "cake layer" mentioned above is a layer formed from the deposition of particulate materials or powdery materials near the membrane surface, for example, when the particulate or powdery materials are filtered by the membrane from a solution with the particulate or powdery materials dispersed.

As shown in FIGS. 32(A) and 32(B), the ladder 2b of the stirrer 2 is constructed by vertically providing a plurality of stirring blades 2c on the stirring axis 2a with a predetermined space in between. The stirrer 2 is also configured to oscillate with respect to the filtration medium 4. A cut section 2d is provided on a stirring blade 2c, and gaps C in which the filtration object can be circulated is formed alternately at the right and left sides, between the stirring blades 2c and the inner walls 3a of the spacer member 3. The filtration object is circulated through the flow path so that stagnation does not occur, and generation of the boundary films and cake layers can be inhibited. Furthermore, strengthening axes 2e are provided so that the plurality of stirring blades 2c moves as one unit.

In the above filtration apparatus, filtration is performed while the formation of the boundary film and the cake layer is inhibited by circulating the filtration object alternately in the right and left sides within the space.

However, the characteristics of the permeating materials and filtration objects differ according to their types, and, thus, there is a need to change the method of circulating the filtration objects according to their characteristics in order to efficiently inhibit formation of the boundary film and cake layer.

SUMMARY OF THE INVENTION

The present invention was conceived to solve the above described problem and one object of the present invention is to provide a reaction and separating filtration apparatus in which the method of circulating the filtration object can be changed in various ways and a variety of reaction and separating filtration processes can be performed with a single apparatus, and a method of using such an apparatus.

In order to achieve this object, a reaction and stirring apparatus according to a first aspect of the present invention is characterized by the following example configurations.

(1.1) In a first aspect, the present invention may be configured as a reaction and stirring apparatus comprising a pair of impermeable supports, a pair of spacer members engaging the end sections of the pair of impermeable supports for providing a predetermined distance between the pair of impermeable supports, and a stirrer provided within a space defined by the pair of impermeable supports and the pair of spacer members, wherein the stirrer includes a stirring axis, a driving source for oscillating the stirring axis, and a plurality of stirring blades mounted on the stirring axis.

Because a solution is oscillation stirred in a space defined by the pair of impermeable supports and the pair of spacer members, the reaction efficiency can be increased. Also, for emulsification, a uniform emulsion can easily be formed.

(1.2) A second configuration of the first aspect of the present invention is a reaction and stirring apparatus of configuration (1.1) wherein a cut section is provided at a portion of each of the stirring blades so that the object can be circulated at the space between the stirring blade and the inner wall of the spacer member and/or at the space between the stirring blade and the inner wall of the impermeable support.

By circulating, for example, the object to be reacted or the object to be emulsified through the cut section, the efficiency of the reaction or emulsification can further be improved.

(1.3) A third configuration of the first aspect of the present invention is a reaction and stirring apparatus of configuration (1.1) or (1.2) wherein a circulation path through which a heat exchange medium can be circulated is provided on at least one of the outer walls of the impermeable supports and of the spacer members.

By employing the above structure, the reaction and stirring process can be performed while heat is exchanged, enabling heating during the reaction and stirring process for, for example, materials that becomes a fluid only when heat is applied, and thus, increasing the flexibility of the apparatus. Moreover, even when reaction is performed at a constant temperature, the apparatus can be cooled or heated via the circulation path.

In order to solve at least some of the problems described above, the reaction and separating filtration apparatus according to a second aspect of the present invention is characterized by the following example configurations.

(2.1) In its second aspect, the present invention may be configured as a reaction and separating filtration apparatus comprising a pair of impermeable supports, a pair of spacer members engaging the end sections of the pair of impermeable supports for providing a predetermined distance between the pair of impermeable supports, a permeable membrane provided within a space defined by the pair of impermeable supports and the pair of spacer members, an outlet provided on at least one of the impermeable members for connecting the space with the outside to enable the material permeating through the permeable membrane to flow out, and a stirrer provided within the space on the permeable object side of the permeable membrane, wherein the stirrer includes a stirring axis, a driving source for oscillating the stirring axis, and a plurality of stirring blades mounted on the stirring axis. A cut section is provided on a portion of the stirring blade so that the permeating object can be circulated within the space between the stirring blade and the inner wall of the spacer member, the space between the stirring blade and the inner wall of the impermeable support, and/or the space between the stirring blade and the permeable membrane.

By oscillating the plurality of stirring blades with a stirring axis, formation of a boundary film near the permeable membrane can be inhibited, resulting in an increase in the permeating efficiency. Moreover, by providing a cut section as described above, the permeating object can be circulated within the space, resulting in more uniform concentration of the permeating object within the space, and thus, allowing for a further increase in the permeating efficiency. When filtration is performed with the above apparatus while letting a reaction occur, the reaction efficiency can be improved by promotion in circulation of the reacting solution via the cut section, and thus, the permeating efficiency can also be improved.

(2.2) In a second configuration, in a reaction and separating filtration apparatus of (2.1), the cut sections are one or more holes alternately provided at the right and left end sections of each of the stirring blades so that the permeating object can be circulated between the stirring blade and the inner wall of the spacer member.

(2.3) In a third configuration, in a reaction and separating filtration apparatus of (2.1), the cut sections are alternately provided at the front and rear end sections of each of the stirring blades so that the permeating object can be circulated between the stirring blade and the inner wall of the impermeable support. Moreover, by changing the position of the cut section, the manner of circulation can be changed.

By providing a cut section as in configurations (2.2) and (2.3), the permeating object can be circulated within the space and formation of a boundary film near the permeable membrane can be prevented.

(2.4) In a fourth configuration, in a reaction and separating filtration apparatus of (2.1), a plurality of barriers are provided on and protruding from the spacer member, the barriers and the stirring blades being alternately located, and a gap is provided in which the permeating object can be circulated, the gap defined by the stirring blade, barrier, and the inner wall of the spacer member.

Turbulence of the permeating object is further promoted by these barriers, resulting in further inhibition of the boundary film formation.

(2.5) In a fifth configuration, in a reaction and separating filtration apparatus of any one of configurations (2.1) through (2.4), a circulation path through which a heat exchange medium can be circulated is provided on at least one of the outer walls of the impermeable supports and spacer members.

By employing the above structure, the permeation process can be performed while exchanging heat, thereby enabling permeation processing while heat is applied, for example, to a material that only becomes a fluid when heat is applied. The flexibility of application of the apparatus can thus be increased.

When the permeating process is performed so that the reaction occurs at a constant temperature, the apparatus can maintain the desired temperature by cooling or heating via the circulation path.

(2.6) In a sixth configuration, the second aspect is a reaction and separating filtration apparatus constructed from a plurality of reaction and separating filtration apparatuses of any of configuration (2.1) through (2.4) provided in parallel.

By linking the parallel apparatuses, a continuous process can be performed.

(2.7) The invention according to its second aspect may also be configured as a reaction and separating filtration apparatus of (2.6), wherein a circulation path through which a heat exchange medium can be circulated is provided between each reaction and separating filtration apparatus.

By employing the above structure, heat can more efficiently be exchanged, and generation efficiency can be improved by, for example, executing identical processes at the plurality of parallel apparatuses. On the other hand, when it is desired that a sequence of reaction and separation processes be executed through a plurality of steps, the sequence of processes can be executed at apparatuses provided in parallel.

A method according to a third aspect of the present invention is characterized by the following example configurations.

(3.1) A first reactant purifying method comprises the steps of oscillation stirring materials to be reacted, and, while oscillation stirring, differentiating and collecting, via a permeable membrane, the product generated by the reaction.

In this manner, the product can be differentiated and recovered while reaction is occurring, enabling a more efficient process in a method for purifying a reactant.

(3.2) In a second method for mixing and separating an emulsion, an emulsion having a radius within a predetermined range is differentiated and collected via a permeable membrane.

In this manner, emulsions with a desired radius can be differentiated and collected.

(3.3) A third method for mixing and separating an emulsion comprises the steps of oscillation stirring and mixing an oil phase and a water phase, and, while oscillation stirring, differentiating and collecting, via a permeable membrane, emulsions having a radius within a predetermined range from the generated emulsions.

In this manner, emulsions with a desired radius can be differentiated and collected while generating the emulsions, and, thus, a more uniform emulsion can be obtained.

(3.4) A fourth method for separating a particulate material or a powdery material comprises the step of differentiating and collecting a particulate material or powdery material having a particle radius within a predetermined range, via a permeable membrane, from particulate materials and powdery materials.

In this manner, particulate material or powdery material with a desired particle radius can be obtained.

(3.5) In a fifth method for filtering and extracting, filtration or extraction is performed via a permeable membrane while oscillation stirring.

By filtering while oscillation stirring, formation of boundary films near the permeable membrane can be inhibited.

(3.6) In a sixth method according to the third aspect of the present invention, in a macromolecule separation method, polymerization reaction is performed while oscillation stirring, and a macromolecule is separated via a permeable membrane.

In this manner, a macromolecule with a desired molecular weight or a particle radius can be separated from the polymerized materials obtained by the polymerization reaction.

(3.7) A seventh method is any one of methods (3.1) through (3.6), wherein the method is executed by a reaction and stirring apparatus of any one of the above (1.1) through (1.3) or by a reaction and separating filtration apparatus of any one of the above (2.1) through (2.7).

(3.8) An eighth method is any one of methods (3.1) through (3.6), wherein the method is a reverse osmosis filtration method for reverse osmosis filtering using any one of the reaction and stirring apparatuses of the above (1.1) through (1.3) or any one of the reaction and separating filtration apparatuses of the above (2.1) through (2.7).

(3.9) A ninth method according to the third aspect of the present invention is any one of methods (3.1) through (3.6), wherein the method is an ultrafiltration method using any one of the reaction and stirring apparatuses of the above (1.1) through (1.3) or any one of the reaction and separating filtration apparatuses of the above (2.1) through (2.7).

BRIEF DESCRIPTION OF THE DRAWINGS

FIG. 16(*b*) is a partial cross sectional view along the line B–B' in FIG. 15.

FIG. 25(*b*) is a diagram showing the particle radius distribution of emulsion A' obtained by filtering emulsion B from emulsion A by an apparatus 10*a* depicted in FIG. 24.

FIG. 25(*c*) is a diagram showing the particle radius distribution of emulsion (A"+C) before emulsion C is separated from emulsion A' by the apparatus 10*b* depicted in FIG. 24.

FIG. 25(*d*) is a diagram showing the particle radius distribution of emulsion A" obtained by separating emulsion C from emulsion A' by an apparatus 10*b* depicted in FIG. 24.

FIG. 36(a) is a front view of another configuration of protruding sections formed on the surfaces of the stirring blades according to the ninth embodiment of the reaction and separating filtration apparatus of the present invention.

FIG. 36(b) is a cross sectional view of the protruding sections shown in FIG. 36(a), which are formed on the surface of the stirring blades.

FIG. 37(a) is a front view of yet another configuration of protruding sections formed on the surfaces of the stirring blades according to the ninth embodiment of the reaction and separating filtration apparatus of the present invention.

FIG. 37(b) is a cross sectional view of the protruding sections shown in FIG. 37(a), which are formed on the surfaces of the stirring blades.

DESCRIPTION OF THE PREFERRED EMBODIMENTS

Figure 1:
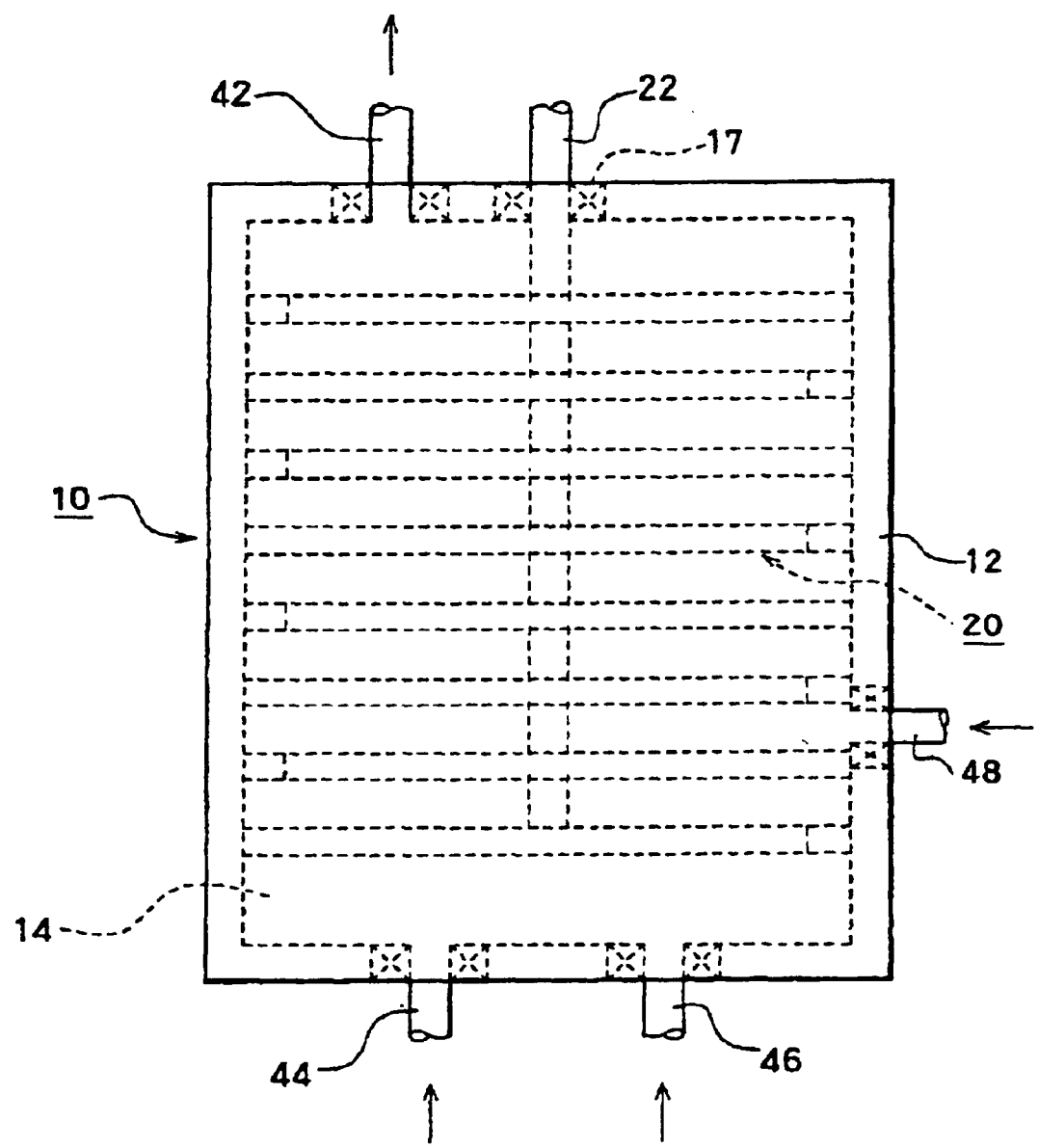
FIG. 1 is an elevational view showing a structure of a first embodiment of a reaction and separating filtration apparatus according to the present invention.

The preferred embodiments of the present invention will now be described referring to the drawings.

First Embodiment

FIGS. 1 through 5 show a structure of a reaction and separating filtration apparatus (hereinafter referred to simply as the "apparatus") according to a first preferred embodiment of the present invention.

Figure 2:
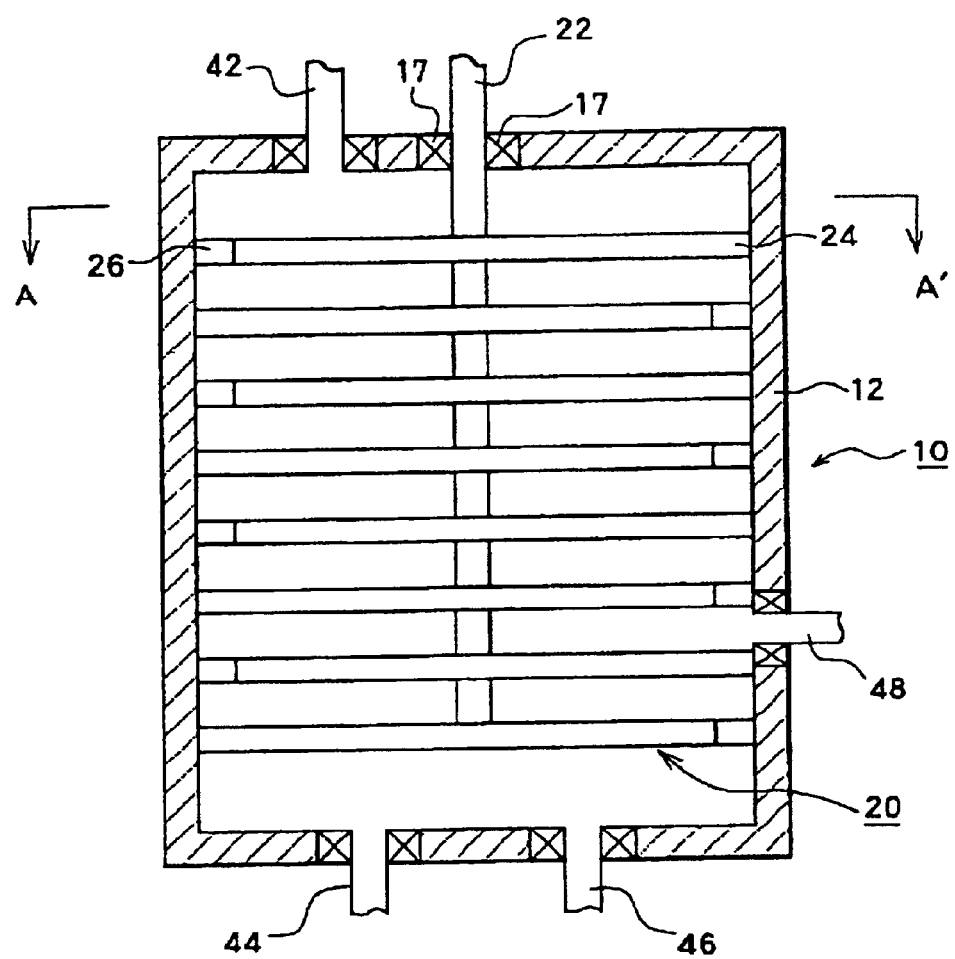
FIG. 2 is a sectional side view showing a structure of a first embodiment of a reaction and separating filtration apparatus according to the present invention.
Figure 3:
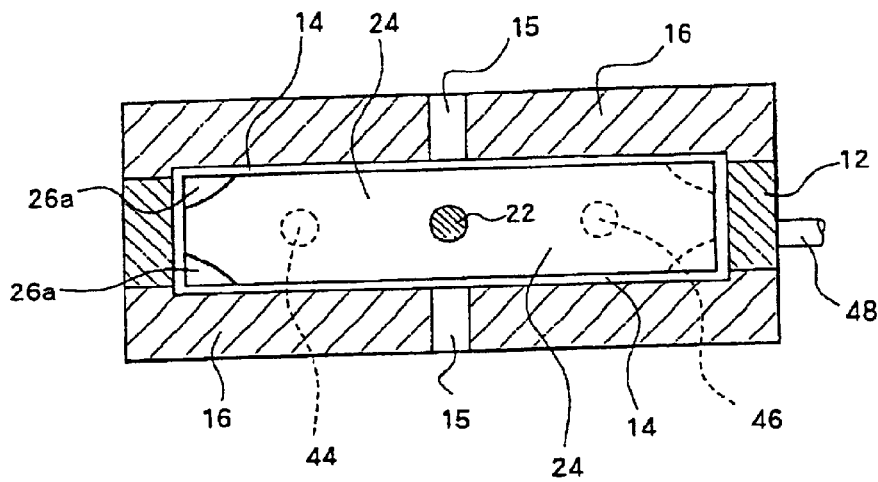
FIG. 3 is a horizontal sectional view showing a structure of a first embodiment of a reaction and separating filtration apparatus according to the present invention.

As shown in FIGS. 1 through 3, the apparatus 10 comprises a pair of impermeable supports 16 and a pair of spacer members 12 which engage the end sections of the pair of impermeable supports 16 for providing a predetermined distance between the impermeable supports 16, with a space formed by the pair of impermeable supports 16 and the spacer members 12. A permeable membrane 14 is provided within the space. Outlets 15 are provided at each of the impermeable supports 16 for connecting the space and outside. The permeating objects permeating through the permeable membrane 14 flows out to the outside from the outlets 15. An exit 42 is provided at the upper section of the apparatus 10 from which the materials in the space can be removed, and insertion holes 44 and 46 are provided at the bottom section of the apparatus 10 from which materials can be introduced into the space. An insertion hole 48 is also provided at the side section of the apparatus 10, which corresponds to the side of the spacer member 12 in the embodiment, through which materials can be introduced to the space. The insertion hole 48 can also be provided at the side of the impermeable support 16 according to the structure of the apparatus 10 as will be described later. It is also possible to use the insertion hole 48 for introducing materials.

A filtration object is inserted within the space and in the section which is surrounded by the permeable membrane 14. A stirrer 20 is placed in the space where the filtration object is present. The stirrer 20 comprises a stirring axis 22, a driving source (not shown) for oscillating the stirring axis 22, and a plurality of stirring blades 24 mounted on the stirring axis 22. Moreover, a bearing 17 is provided at the upper section of the apparatus for receiving the stirring axis. In the example used to describe this first embodiment, a bearing is provided, but a structure without a bearing is also possible, as long as the stirring axis can be oscillated.

Any known driving source such as a motor or a supersonic device can be used as the driving source. As a permeable membrane 14, a membrane having a matrix shape with a plurality of holes can be used such as, for example, a macromolecule membrane and a permeable inorganic membrane. As a macromolecule membrane, an organic membrane such as, for example, a "debs filter" or a "membrane filter" or a functional membrane which changes (including opening/closing of a hole) the hole radius depending on the pH or on the temperature can be used. As a permeable inorganic membrane, for example, a "wedge wire screen" which has a triangular fiber cross section in which the radius of the permeating material is limited depending on the distance between the fibers, a ceramic membrane, a porous glass membrane, a sintered metal membrane, or a plasma processed inorganic membrane can be used.

A cut section 26 is provided on a portion of the stirring blade 24 so that the permeating object can be circulated between the stirring blade 24 and the inner wall of the spacer member 12 and between the stirring blade 24 and the permeable membrane 14. Specifically, the cut sections 26 are alternately provided on the layered stirring blades at the right and left sides, so that the permeating object can be circulated.

Figure 4:
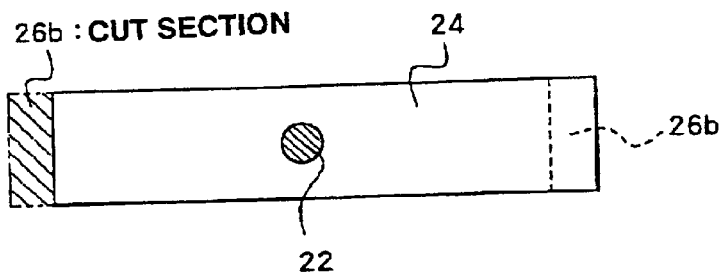
FIG. 4 is a diagram showing another example of cut sections on stirring blades for use in an apparatus of the present invention.
Figure 5:
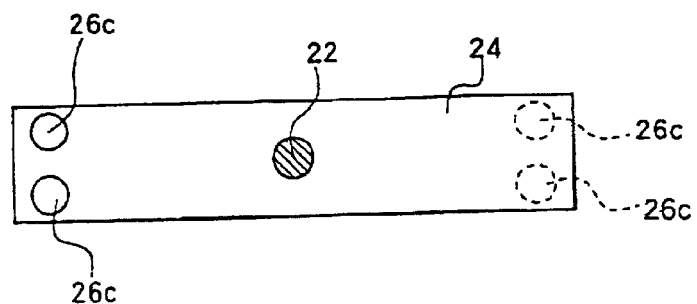
FIG. 5 is a diagram showing yet another example of cut sections on stirring blades for use in an apparatus of the present invention.

The cut section 26 can have a shape of cuts 26a at both edges of the end portion of the stirring blade as shown in FIG. 3, a shape of a cut section 26b at the end portion of the stirring blade as shown in FIG. 4, or a shape of at least one hole 26c provided at the end portion of the stirring blade. The shape of the cut section is not limited to the shapes described above, and can be any form which can promote circulation of the permeating object.

A wire-type membrane can also be provided between the permeable membrane 14 and the impermeable support 16. Normally, because the permeable membrane 14 is a thin film, the permeable membrane 14 is loosened slightly during the stirring oscillation of the stirring blade 24. If the stirring blade 24 contacts the permeable membrane 14 at this point, the permeable membrane 14 can be damaged. It is thus preferable to provide a wire-type membrane between the permeable membrane 14 and stirring blade 24 so that contact between the two can be prevented.

At least one permeable membrane 14 can be provided and pinched between the pair of impermeable supports 16.

Figure 14:
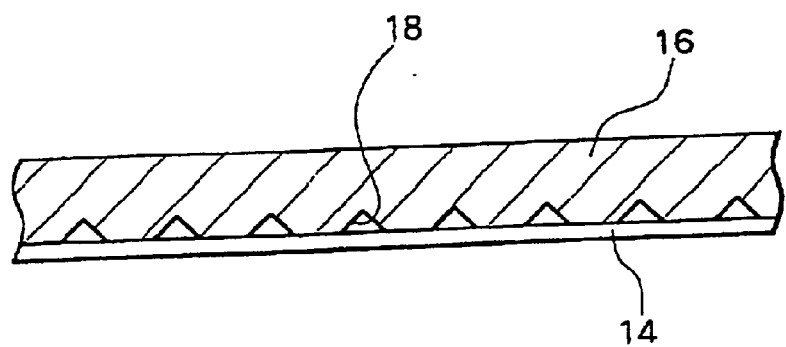
FIG. 14 is a diagram showing a structure of a channel provided on the impermeable support according to the present invention.
Figure 15:
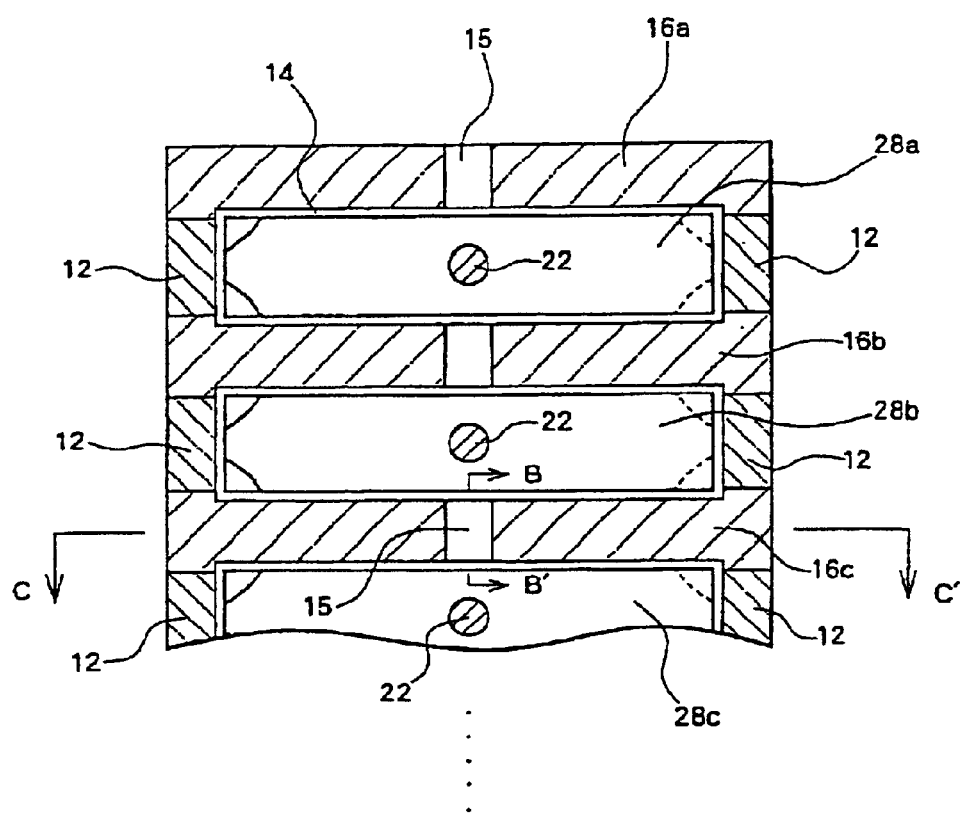
FIG. 15 is a cross sectional view showing a composite structure of a sixth embodiment of a reaction and separating filtration apparatus according to the present invention.

As shown in FIG. 14, at least one channel 18 is formed on the inner wall surface of the impermeable support 16. In this manner, the materials permeating through the permeable membrane 14 can easily be guided to the outlet 15 via the channels 18. In the first embodiment, the horizontal cross section of the channel 18 is approximately triangular, but the cross sectional shape can be any shape as long as the permeated materials can smoothly arrive at the outlet 15.

Second Embodiment

Figure 6:
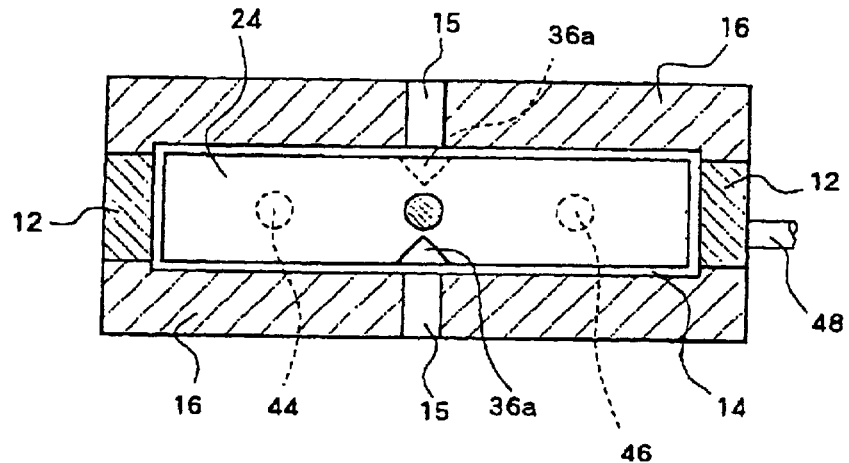
FIG. 6 is a horizontal sectional view showing a structure of a second embodiment of a reaction and separating filtration apparatus according to the present invention.
Figure 7:
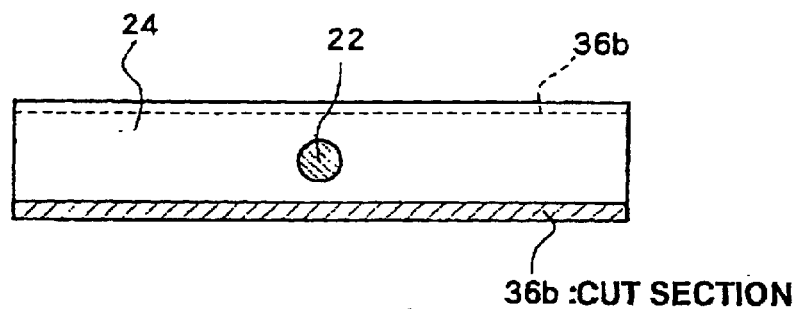
FIG. 7 is a diagram showing another example of cut sections on stirring blades for use in an apparatus of the present invention.
Figure 8:
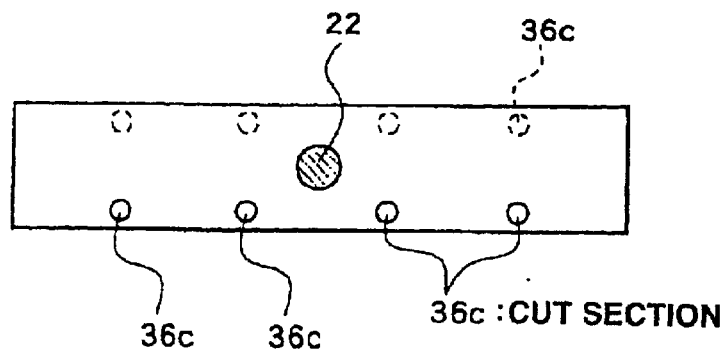
FIG. 8 is a diagram showing yet another example of cut sections on stirring blades for use in an apparatus of the present invention.

FIGS. 6 through 8 show the structure of a reaction and separating filtration apparatus (hereinafter referred to as the "apparatus") according to a second embodiment of the present invention. Elements identical to those described above for the first embodiment will be assigned the same reference numerals and will not be described again.

In the first embodiment, cut sections are alternately provided at the right and left ends of the stirring blades 24. In the second embodiment, the cut sections are alternately provided at the front and rear ends of the stirring blades 24 so that the permeating object can be circulated between the stirring blade 24 and the inner wall of impermeable supports 16, and between the stirring blades 24 and the permeable membranes 14.

In other words, the cut section in the second embodiment can be a triangular cut section 36a in a portion of the stirring blade 24 in the longitudinal direction as shown in FIG. 6, a section of stirring blade 24 along the longitudinal direction 36b removed as shown in FIG. 7, or at least one hole 36c in the longitudinal direction of the stirring blade 24 as shown in FIG. 8. The shape of the cut section is not limited to those described above, and can be any shape as long as the cut section can promote circulation of the permeating object.

Third Embodiment

Figure 9:
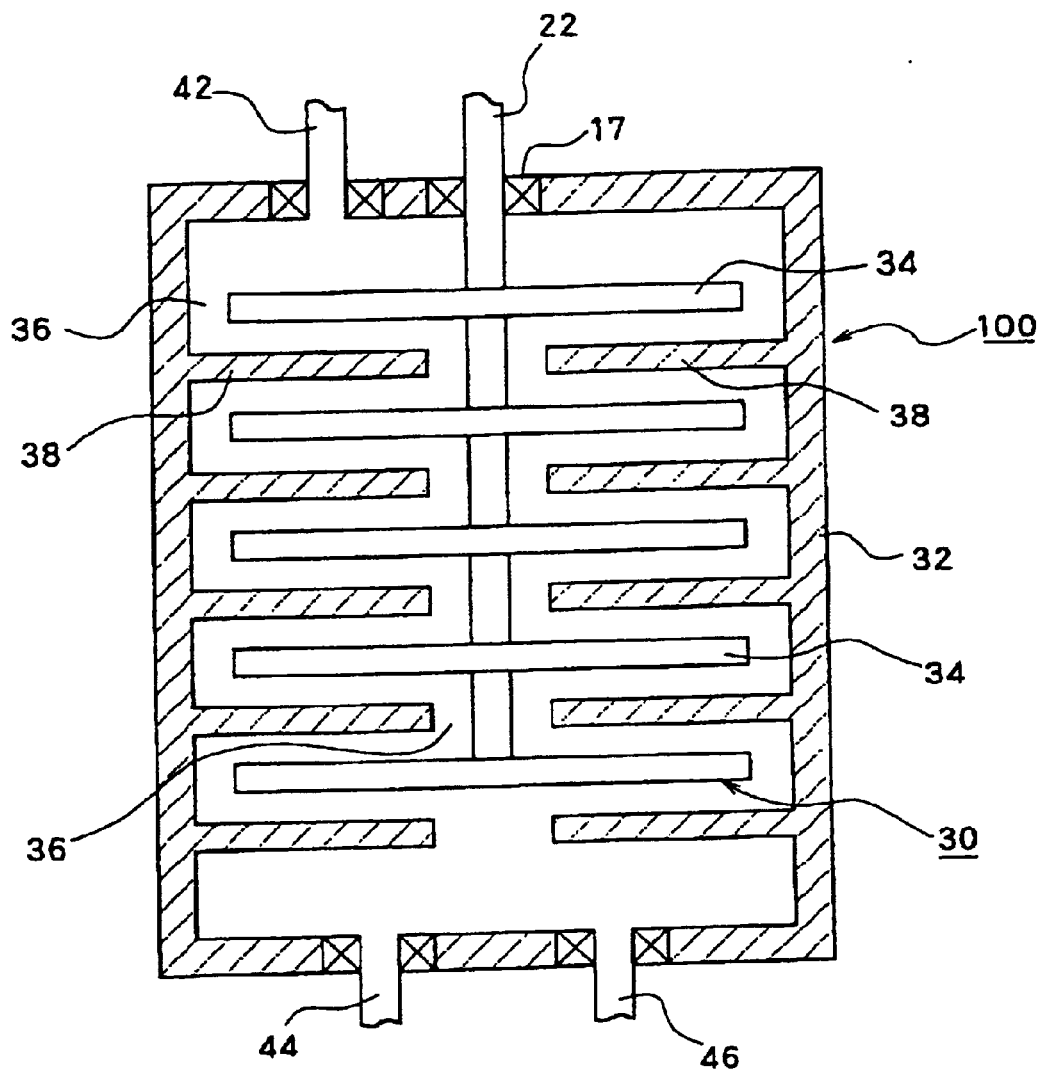
FIG. 9 is a sectional side view showing a structure of a third embodiment of a reaction and separating filtration apparatus according to the present invention.

FIG. 9 shows a structure of a reaction and separating filtration apparatus (hereinafter referred to as the "apparatus") according to a third embodiment of the present invention. Elements identical to those described above for the first embodiment are referred to by the same reference numerals and will not be described again.

In the third embodiment, a plurality of barriers 38 are provided on and protruding from the inner walls of the spacer members 32. The barriers 38 and stirring blades 24 are alternately placed, and gaps 36 are provided between the stirring blades 24, barriers 38, and the inner wall of the spacer member 32, so that the permeating object can be circulated.

In this manner, turbulence of the permeating object is further promoted compared to the above embodiments, and the short paths are removed. The formation of the boundary films can therefore further be inhibited.

In the example used to illustrate the third embodiment, barriers 38 are formed protruding from both spacer members 32, but the structure is not limited to this configuration, and the barriers 38 can also be formed on and protruding from only one of the spacer members 32.

In the example of the third embodiment, the permeable membrane (or filtration membrane) 14 is formed only on the side of the impermeable support 16, but the structure is not limited to this configuration, and it is also possible to provide a permeable membrane also at the spacer member side.

Fourth Embodiment

According to a fourth embodiment of the present invention, a jacket (not shown) through which heat exchange medium can be circulated can be formed to cover the outer surface of the apparatus 100 shown in FIG. 9. As the heat exchange medium, for example, a cool heat exchange medium such as cooling water, liquid nitrogen, and liquid carbon dioxide, or a hot heat exchange medium such as warm water, water vapor, and silicon oil can be used.

In this manner, because the apparatus can be operated at a temperature region suited for the reaction and separating filtration process, the processing efficiency can be improved.

Fifth Embodiment

Figure 10:
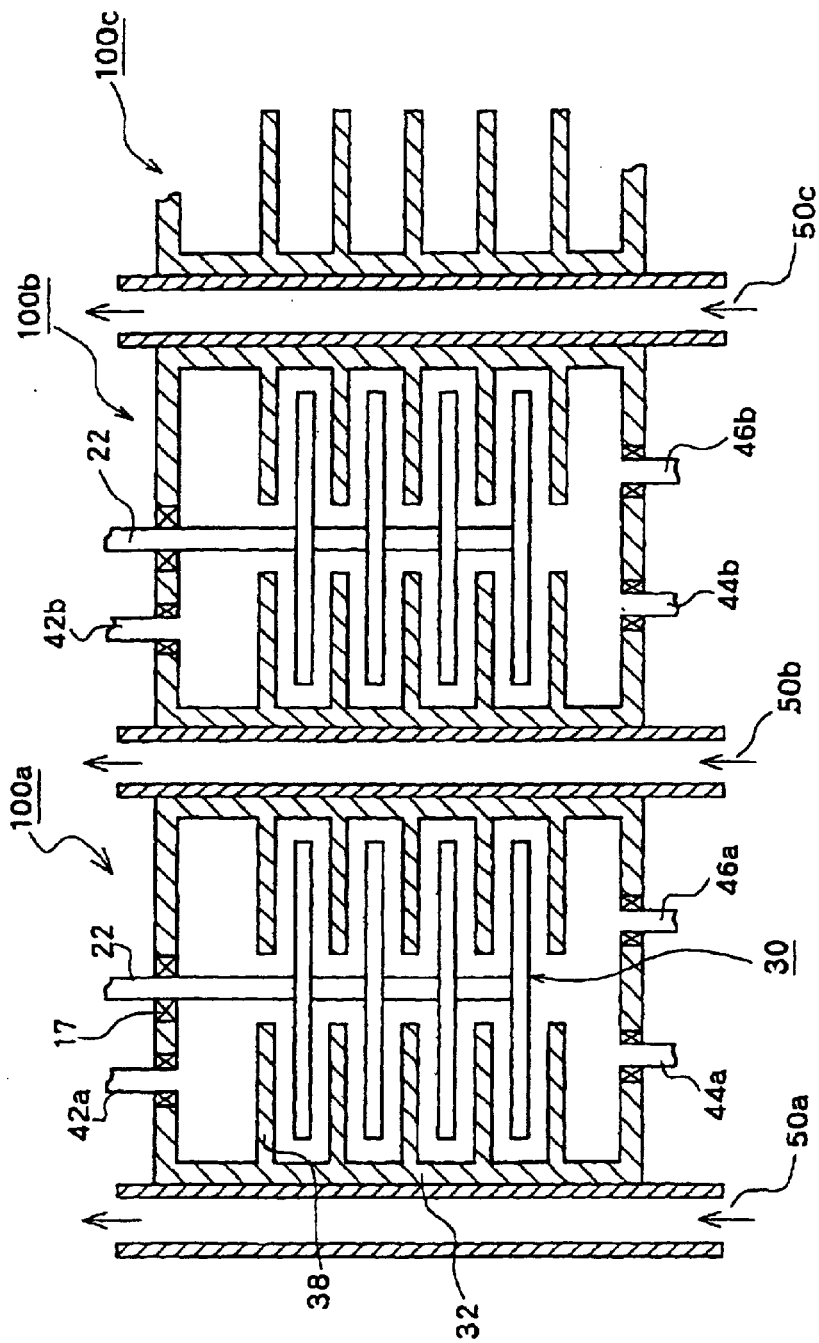
FIG. 10 is a sectional side view showing a structure of a fifth embodiment of a reaction and separating filtration apparatus according to the present invention.
Figure 11:
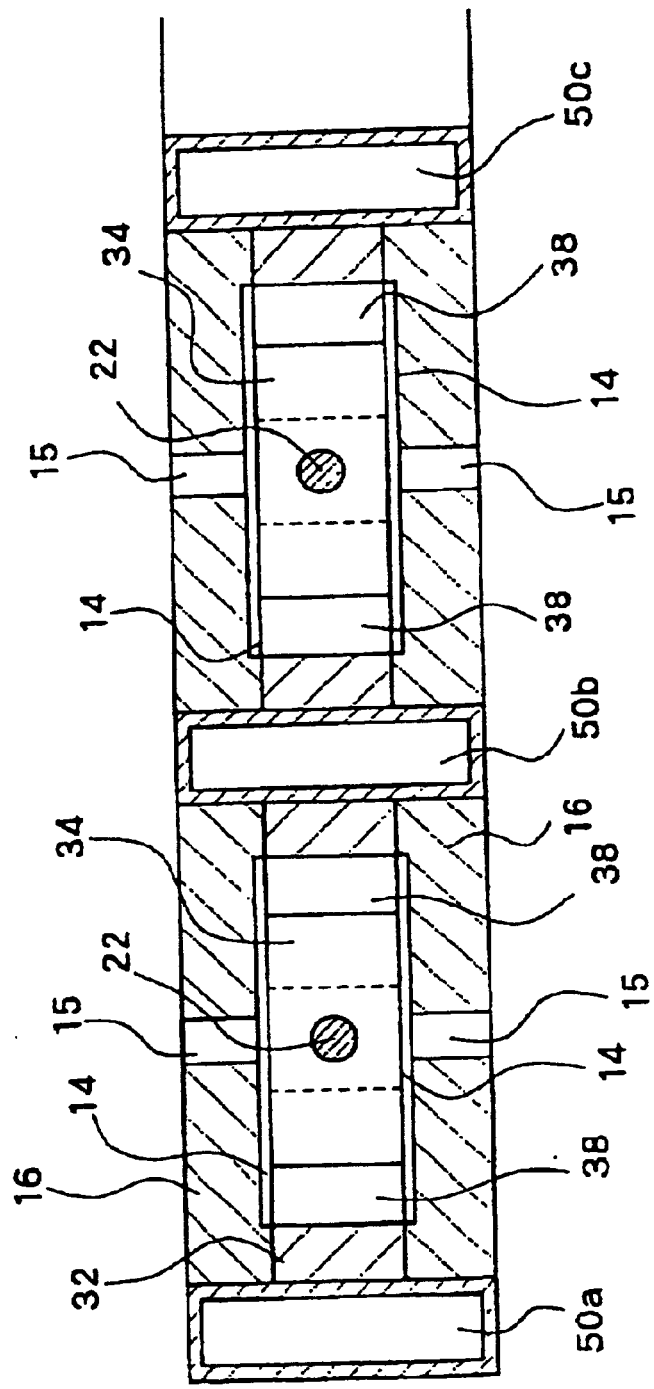
FIG. 11 is a horizontal sectional view showing a structure of a fifth embodiment of a reaction and separating filtration apparatus according to the present invention.

FIGS. 10 and 11 show a structure of a reaction and separating filtration apparatus (hereinafter referred to as the "apparatus") according to a fifth embodiment of the present invention. The elements identical to those described for the above embodiments are assigned the same reference numerals and will not be described again.

In the device according to the fifth embodiment, at least two apparatuses 100 of the fourth embodiment described above are provided in parallel, and circulation paths 50a, 50b, 50c, . . . in which heat exchange medium can be circulated are provided between the apparatuses 100, that is, between the outer walls of the spacer members 32. As the heat exchange medium, any of the heat exchange media described above for the fourth embodiment can be used, and thus, will not be further described here.

By providing circulation paths 50a, 50b, and 50c between the outer walls of the spacer members 32, heat exchange of the permeating object can efficiently performed through the inner wall and a barrier 38 of the spacer 32.

Although in the example used to describe the fifth embodiment of the present invention, circulation paths 50a, 50b, and 50c are provided only on the spacer 32 side, the configuration is not limited to such an arrangement, and it is also possible to provide circulation paths also on the impermeable supports 16 side for circulating the heat exchange medium. This can further improve the heat exchange efficiency.

Sixth Embodiment

FIGS. 15 through 19 show the structure of a reaction and separating filtration apparatus (hereinafter referred to as the "apparatus") according to a sixth embodiment of the present invention. Elements identical to those described for earlier embodiments are assigned the same reference numerals and will not be described again.

According to the sixth embodiment, the apparatus of the first embodiment is altered so that adjacent spaces 28a and 28b, and 28b and 28c, to which the permeating objects are inserted, have an overlapping structure to share the impermeable supports 16b and 16c, respectively. In this manner, the size of the apparatus can be reduced, even when a plurality of apparatus structures are layered.

Figure 16A:
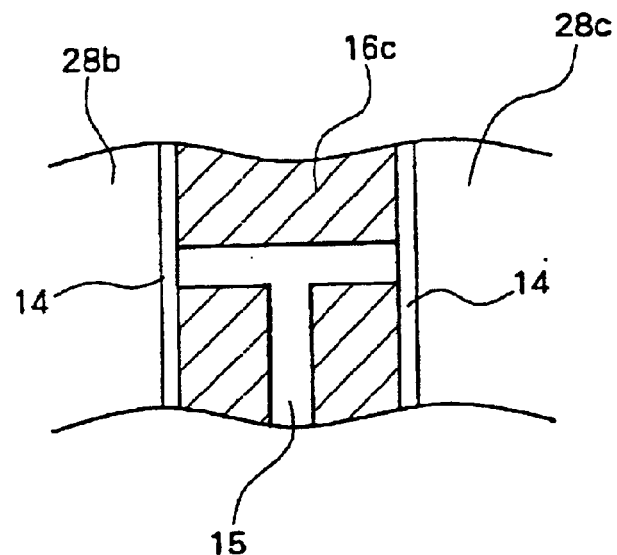
FIG. 16(*a*) is a partial cross sectional view along the line B–B' in FIG. 15.
Figure 16B:
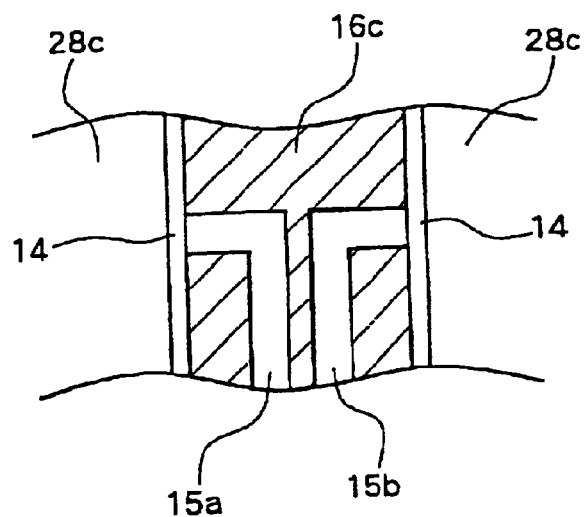

In the apparatus described above, the outlets 15 provided on the impermeable supports 16b and 16c have a structure as shown in FIGS. 16(A) and 16(B). In other words, when same permeating material is obtained from the adjacent spaces 28b and 28c, the structure of the outlet is preferably an approximate T-shape such as the vertical cross section of the outlet 15 in the thickness direction of the impermeable support 16 shown in FIG. 16(A). When different permeating materials are obtained from the adjacent spaces 28b and 28c, on the other hand, the vertical cross sections of the outlets 15a and 15b are preferably an L-shape as shown in FIG. 16(B).

Figure 17:
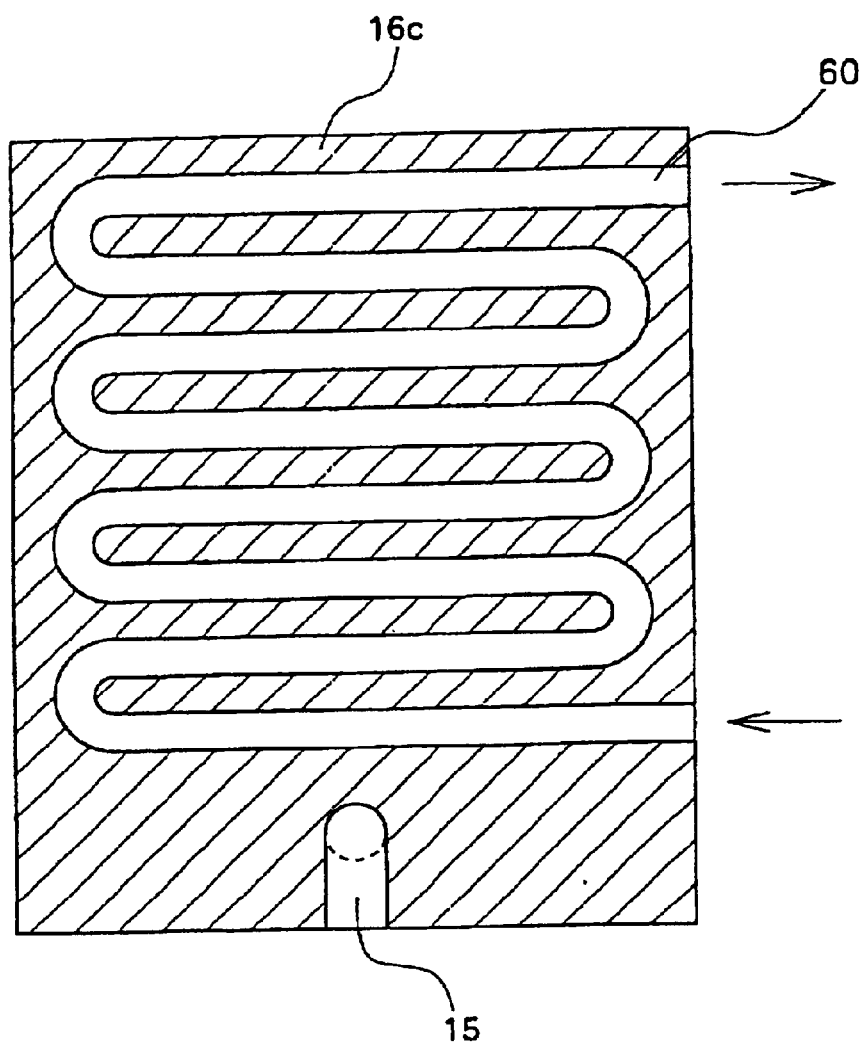
FIG. 17 is a cross sectional diagram along the line C–C' in FIG. 15.

Moreover, in the apparatus having an overlapping structure as described above, when cooling or heating with a heat exchange medium is desired, a circulation path 60 through which the heat exchange medium can be circulated is provided within the shared impermeable supports 16b and 16c, as shown in FIG. 17. The shape of the circulation path 60 is not limited to the accordion shape shown in FIG. 17, and can be any shape as long as the heat can be exchanged. In the sixth embodiment, the heat exchange medium is introduced from the bottom and flows out at the top, but it is also possible to reverse the flow direction.

Figure 18:
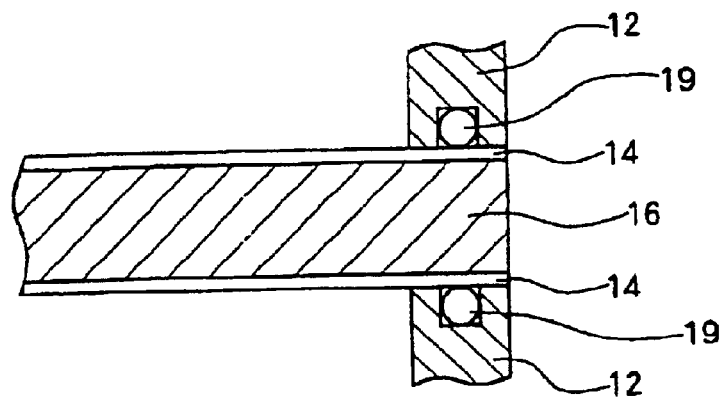
FIG. 18 is a diagram explaining a structure for fixing the permeable membrane by impermeable supports and spacer members.

It is also possible to eliminate the permeable membrane 14 on the entire inner wall. As shown in FIG. 18, the permeable membrane 14 can also be provided on only the impermeable supports 16. In such a case, the permeable membrane 14 can be fixed by pinching the end sections of the permeable membrane 14 between the impermeable support 16 and the spacer member 12 and engaging the impermeable support 16 and the spacer member 12 by, for example, an O-ring 19.

Figure 19:
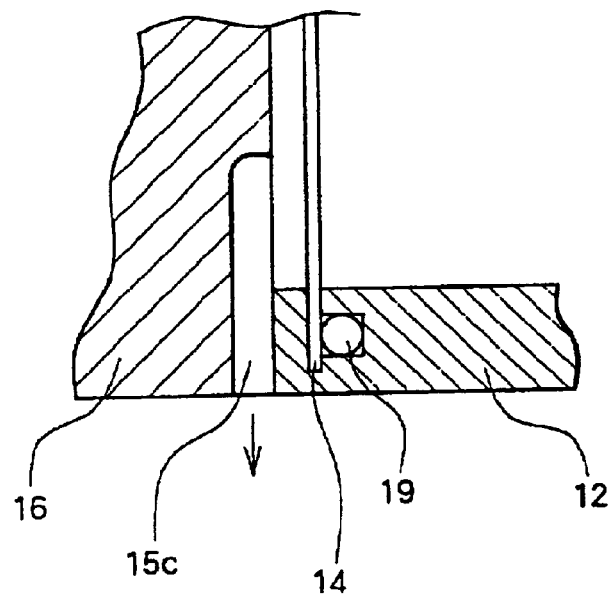
FIG. 19 is a diagram for explaining the structure for fixing the permeable membrane near the outlet.

As shown in FIG. 19, it is also possible to construct the apparatus so that a predetermined distance is provided between the impermeable support 16 and the permeable membrane 14. The outlet 15c is provided at the lower section of the apparatus and a discharging hole is provided at the bottom section of the apparatus. The end section of the permeable membrane 14 at the bottom section of the apparatus near the outlet 15c can be pinched by a channel provided at the end section of the spacer member 12 and fixed by the O-ring 19.

Seventh Embodiment

Figure 20:
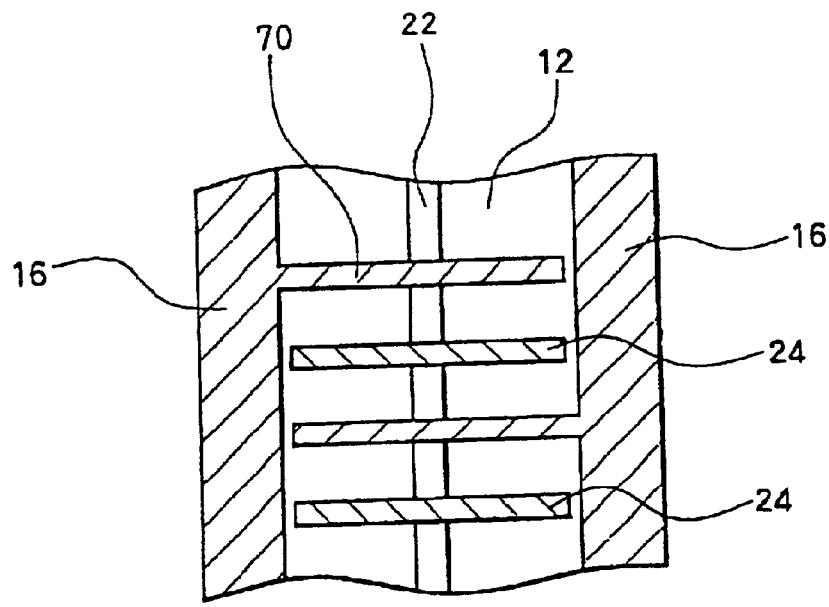
FIG. 20 is a vertical cross sectional view showing a structure of a seventh embodiment of a reaction and stirring apparatus according to the present invention.

FIG. 20 shows a structure of a reaction and stirring apparatus according to a seventh embodiment of the present invention. Elements identical to those described for earlier embodiments are assigned the identical reference numerals and will not be described again.

In an apparatus according to the seventh embodiment, protruding barriers 70 are provided on the inner walls of a pair of opposing impermeable supports 16. Turbulence of the solution or the like within the apparatus during the stirring oscillation can be promoted by the barriers 70, so that short paths are avoided and the efficiency of the reaction and emulsification can be improved.

When it is desired to exchange heat by a heat exchanging medium, it is possible to provide a circulation path 60 within the impermeable support 16, as in the structure of the sixth embodiment, shown in FIG. 17.

Eighth Embodiment

Figure 21:
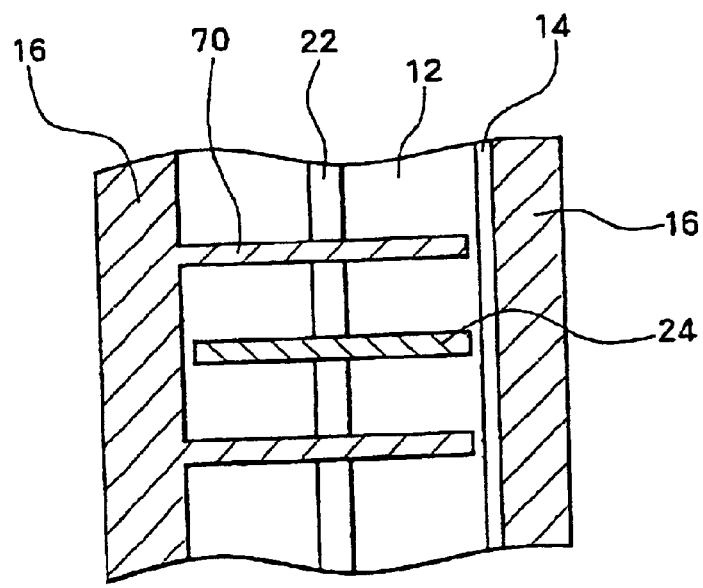
FIG. 21 is a vertical cross sectional diagram showing a structure of an eighth embodiment of a reaction and separating filtration apparatus according to the present invention.

FIG. 21 shows a structure of a reaction and separating filtration apparatus (hereinafter referred to as the "apparatus") according to an eighth embodiment. Elements identical to those of the first through seventh embodiments are assigned identical reference numerals and will not be described again.

In the eighth embodiment, a plurality of protruding barriers 70 are provided on the inner wall of only one of the opposing impermeable supports 16, and a permeable membrane 14 is provided on the inner wall of the other impermeable support 16.

Figure 22:
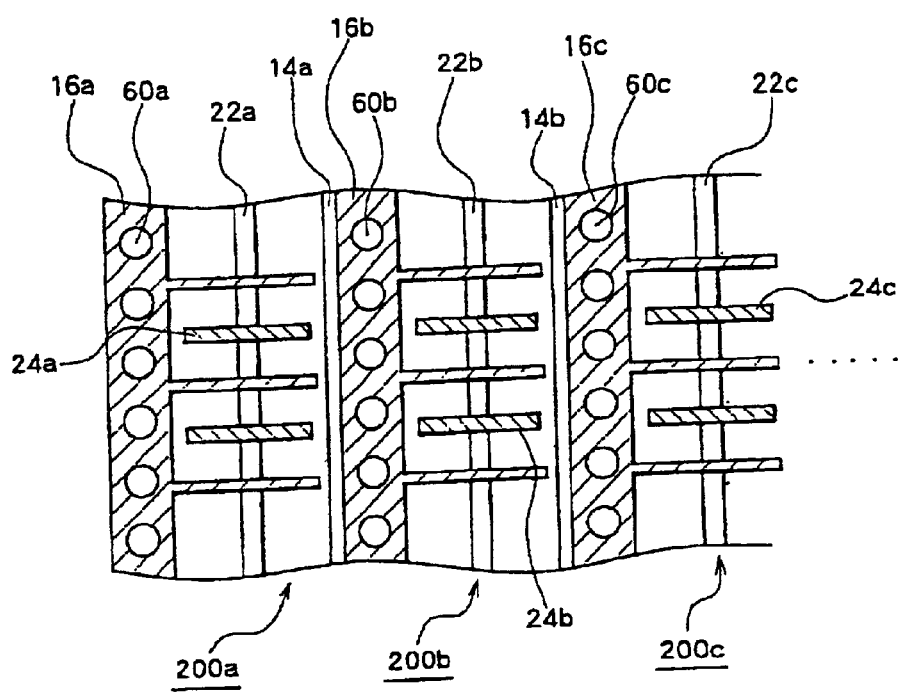
FIG. 22 is a vertical cross sectional diagram for explaining the structure of a composite apparatus constructed by altering the apparatus depicted in FIG. 21.

As shown in FIG. 22 as apparatuses 200a, 200b, and 200c, altered from the apparatus described above, it is possible to construct an overall apparatus so that the apparatuses are overlapped and share impermeable supports 16b and 16c. By employing such a configuration, the overall size of the apparatus can be reduced.

Figure 23:
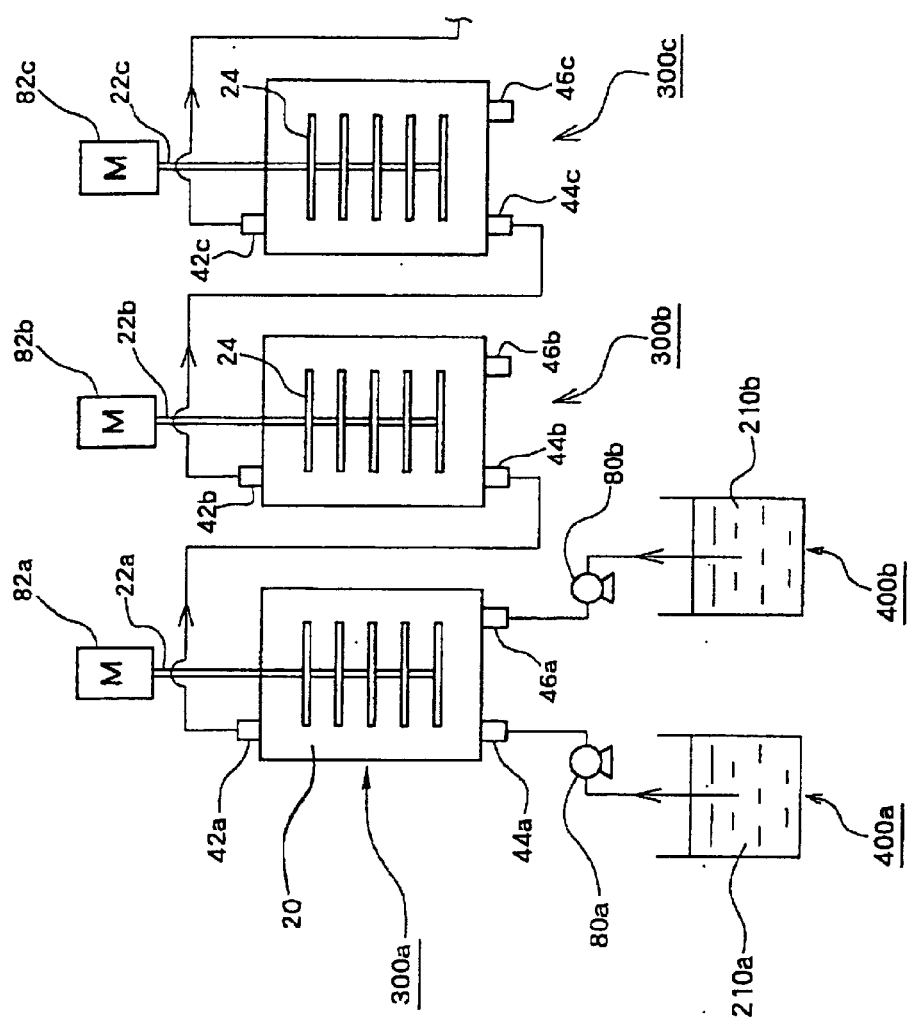
FIG. 23 is a schematic diagram for explaining a structure which enables continuous reaction by linking in parallel a plurality of the apparatuses of the present invention.

FIG. 23 shows schematically an apparatus in which a plurality of units are linked together to allow continuous processing.

Different solutions 210a and 210b are stored in storage tanks 400a and 400b. The solutions 210a and 210b are respectively introduced to the entrances 44a and 46a of an apparatus 300a by respective pumps 80a and 80b. A stirrer 20 is stirred and oscillated by a motor 82a to stir the two solutions. The stirred solution is removed via an exit 42a and further introduced to an entrance 44b of an apparatus 300b. The stirred solution is further stirred at the apparatus 300b, and then introduced to an entrance 44c of an apparatus 300c from an exit 42b. In this manner, by continuously stirring the solution by a plurality of apparatuses, it is possible to promote efficient reaction and efficient emulsification. Moreover, by providing permeable membranes respectively at each of the apparatuses 300a, 300b, and 300c, permeating material can efficiently be obtained from the continuously flowing solution.

In FIG. 23, a plurality of independent apparatuses, for example, those described in earlier embodiments, are provided in parallel. However, the structure is not limited to such a configuration. For example, it is also possible to arrange a composite apparatus in which the impermeable supports 16 are shared and the units are overlapped at the impermeable supports 16 as shown in FIG. 22, or to arrange the same composite apparatus horizontally to layer the units.

In the apparatuses of embodiments 1 through 6 and 8 described above, it is possible to extract, filter and separate while mixing and reacting. In particular, it is possible to separate a macromolecule while letting a polymerization reaction occur within the same apparatus, or to separate an emulsion while preparing the emulsions. With the apparatus of the seventh embodiment, it is possible to stir, emulsify, and allow a reaction other than filtration and permeation to occur.

Moreover, by increasing the oscillation rate of the stirring blade, the permeating flux can be increased. Furthermore, because the apparatus employs oscillation stirring, generation of a boundary film for even a small amount of flow of the original solution can be inhibited. Thus, extraction, filtration, and separation can be efficiently performed.

Figure 12:
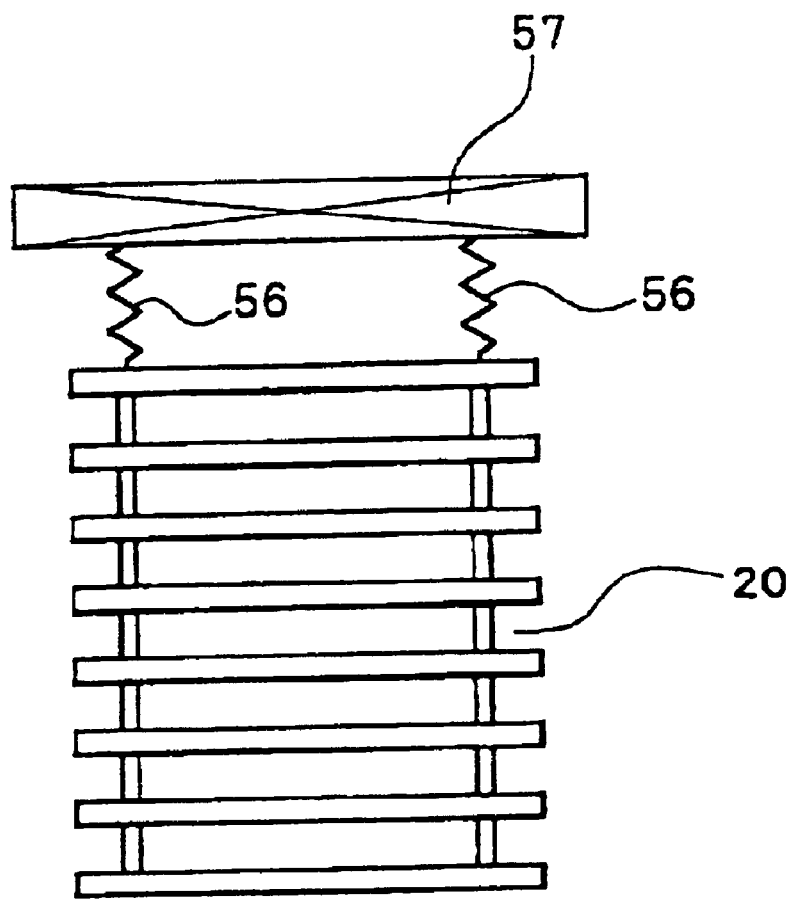
FIG. 12 is a diagram showing an example of a driving source for a stirrer according to the present invention.
Figure 13:
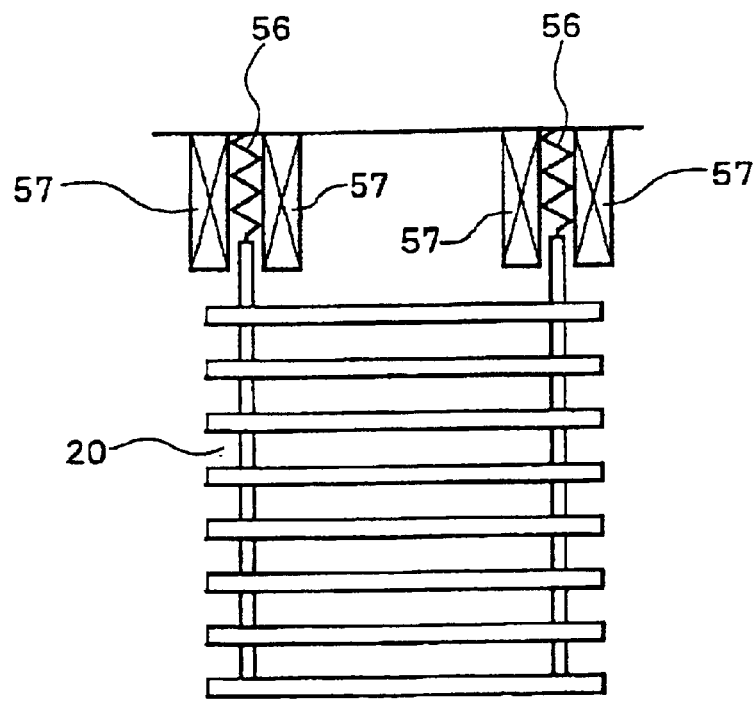
FIG. 13 is a diagram showing another example of a driving source for a stirrer according to the present invention.

As a driving mechanism for the stirrer 20 of the apparatus according to the present invention, a mechanism constructed from a magnetic material and a spring, such as the structures shown in FIGS. 12 and 13 can be employed. FIG. 12 shows a structure in which a spring is mounted on an axis of the stirrer 20 constructed from a magnetic material, and the stirrer 20 is oscillated by intermittently applying an electric field to a solenoid 57. FIG. 13 shows a structure in which an axis of the stirrer 20 is constructed from a magnetic material and the stirrer 20 is oscillated by a combination of a pair of springs and a pair of solenoids. The springs and solenoids can be integrated with the spacer member or with the impermeable supports by embedding or by mounting, or can be provided as independent components.

Ninth Embodiment

Figure 33:
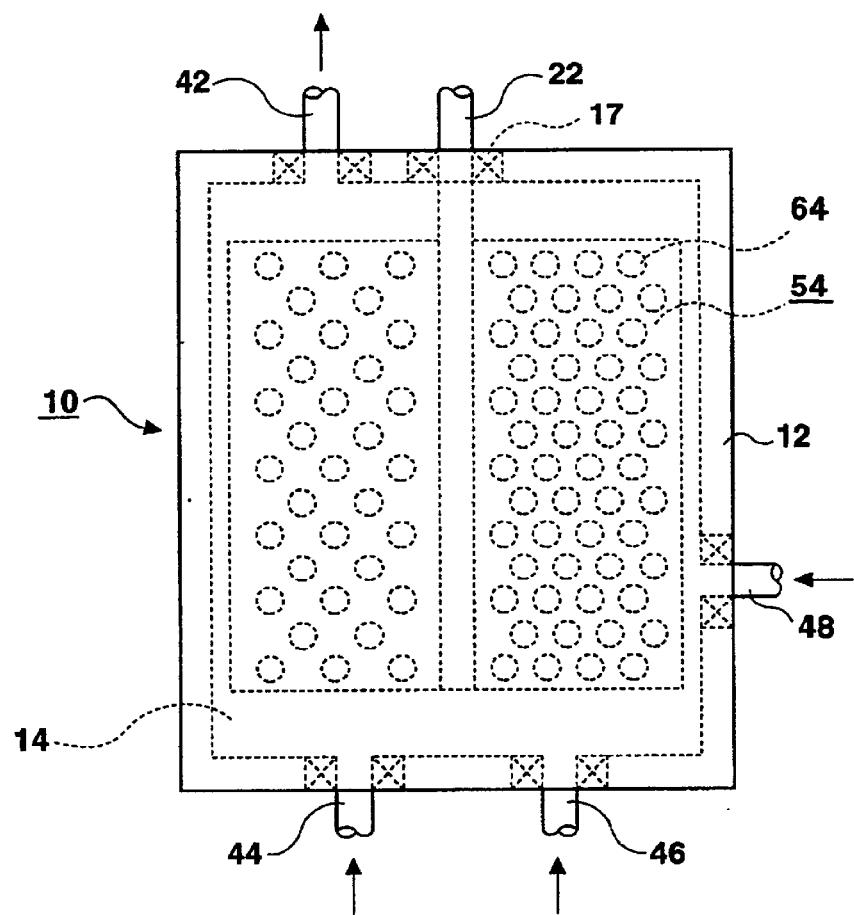
FIG. 33 is a front view of a configuration according to a ninth embodiment of the reaction and separating filtration apparatus of the present invention.
Figure 34:
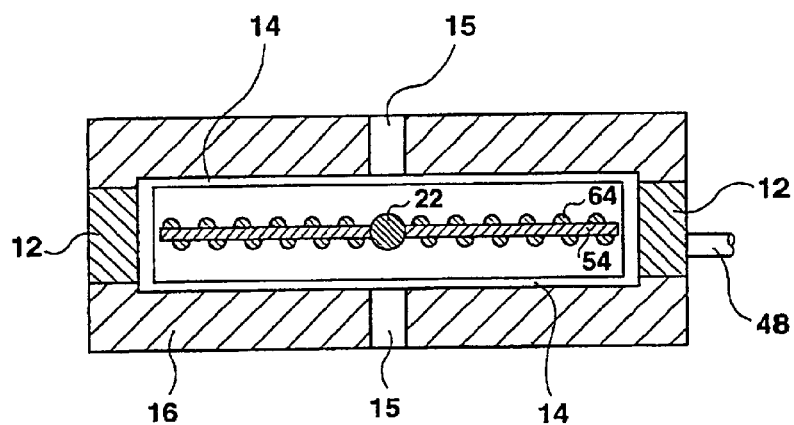
FIG. 34 is a side cross sectional view of a configuration according to a ninth embodiment of the reaction and separating filtration apparatus of the present invention.

FIGS. 33 and 34 show a ninth embodiment of the present invention in which vertical stirring blades 54 are used in place of the horizontal stirring blades 24 of the previous embodiments. Elements identical to those described for the first embodiment are assigned the same reference numerals and will not be described again.

Specifically, in the ninth embodiment, a pair of stirring blades 54 are arranged in parallel with the impermeable supports 16 and at both sides of the stirring axis 22 in the radial direction. The stirring blades 54 oscillate in the vertical direction by oscillating the stirring axis 22 in the vertical direction. The stirring blades 54 can be integrated into the stirring axis 22 or can be removably mounted on the stirring axis 22. Moreover, the length of the stirring blade 54 in the vertical direction is slightly less than the height of the apparatus 10 and the length of the stirring blade 54 in the horizontal direction is slightly less than the width of the apparatus 10 such that a gap is formed between the stirring blades 54 and the spacer members 12. By providing such a gap, the entirety of a solution, including an aqueous solution, a dispersed solution, and an emulsion, can be stirred.

Irregularities are provided on both the front and the back sides of the stirring blades 54. These irregularities on the surfaces of the stirring blades 54, causes turbulence in the solution within the apparatus 10 when stirring blades 54 are vertically oscillated, thereby producing a more desirable stirring environment. The irregularities can be integrated in the stirring blades 54 or can be separately formed by an independent member.

Figure 35A:
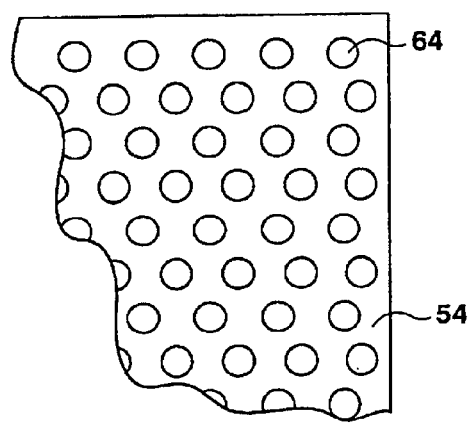
FIG. 35(a) is a front view of a configuration of protruding sections formed on the surfaces of the stirring blades according to the ninth embodiment of the reaction and separating filtration apparatus of the present invention.
Figure 35B:
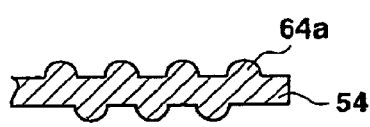
FIG. 35(b) is a cross sectional view of the protruding sections shown in FIG. 35(a), which are formed on the surfaces of the stirring blades.
Figure 35C:
FIG. 35(c) is another cross sectional view of the protruding sections shown in FIG. 35(a), which are formed on the surfaces of the stirring blades.

In this ninth embodiment, a plurality of protruding sections 64 are provided on the surfaces of the stirring blades 54 as an example of the irregularities. Each protruding section 64 can be, for example, a hemispherical protruding section 64a as shown in FIGS. 35(a) and 35(b), a cylindrical protruding section 64b as shown in FIGS. 35(a) and 35(c), a rectangular prism protruding section 74 as shown in FIG. 36, or a triangular prism protruding section 84 as shown in FIG. 37. The shape of the protruding section is not limited to those described above, and can be any shape that can produce turbulence. The height of the protruding sections can be varied depending on the desired turbulence condition and the number of the protruding sections can be varied depending on the desired turbulence level. It is preferable that the protruding sections are placed with a suitable distance in between and that adjacent protruding sections are alternately provided in the vertical or horizontal direction, as shown in FIGS. 35 through 37 for further production of turbulence.

Similar to the apparatuses of the first through sixth and the eight embodiments, the apparatus of the ninth embodiment is capable of extracting, filtering, or separating while mixing and allowing a reaction to occur. Moreover, the apparatus of the ninth embodiment is also capable of simultaneously performing polymerization reaction and separation of macromolecules in a single apparatus and of separating emulsions while preparing the emulsions.

Similar to the above embodiments, the ninth embodiment can employ the mechanisms shown in FIGS. 12 and 13.

The apparatus of the ninth embodiment can also be realized with a capability for allowing a heat exchange medium to be circulated in the manner similar to the fifth embodiment, and a plurality of apparatuses of the ninth embodiment can be overlapped to form a combined apparatus similar to the sixth or eighth embodiment.

Tenth Embodiment

Figure 38:
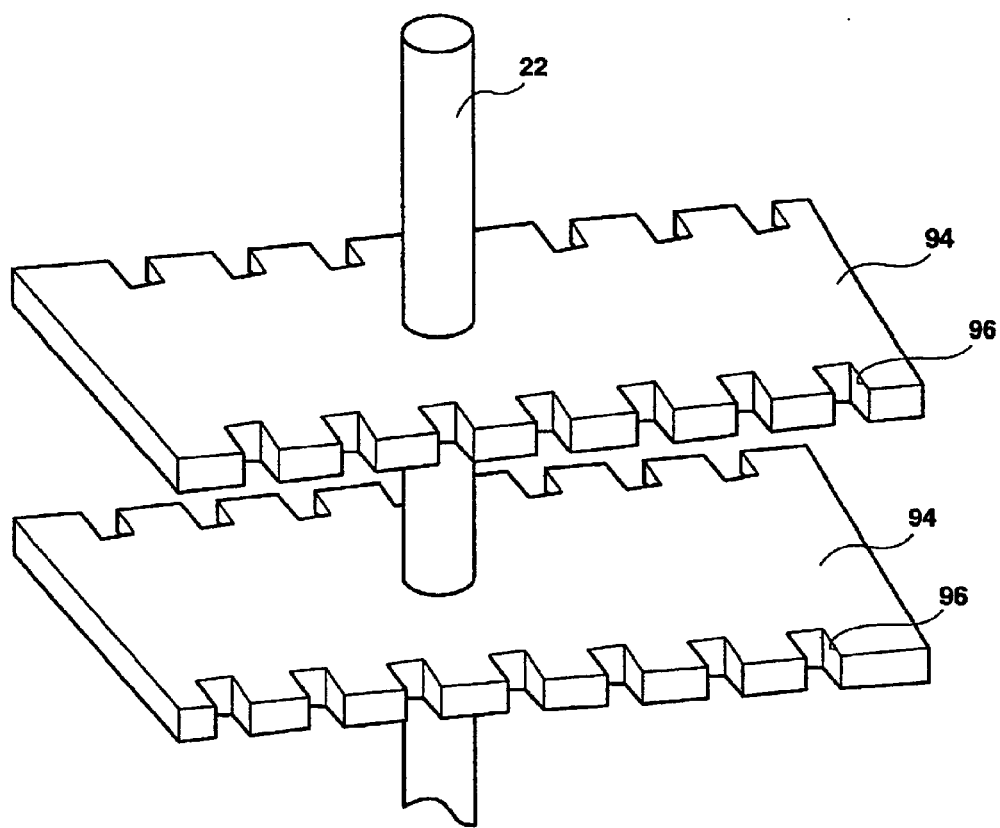
FIG. 38 is a perspective view showing the structure of a tenth embodiment of the reaction and separating filtration apparatus according to the present invention.

As shown in FIG. 38, in the tenth embodiment of the present invention, instead of providing cut sections on the horizontal stirring blades 24 as in the first through eighth embodiments, a plurality of channels 96 are formed on both side surfaces in the longitudinal direction, that is, the surfaces that face the impermeable supports 16, of horizontal stirring blades 94. Elements identical to those described for the first embodiment are assigned the same reference numerals and will not be described again.

Specifically, in order to effectively cause turbulence at stirring, it is preferable that the channels 96 of the stirring blades 94 be formed such that the positions of the channels 96 in the vertical plane on a stirring blade 94 do not overlap with the positions of the channels 96 in the vertical plane on adjacent stirring blades 94. The shape of the channels 96 can be any shape that can cause desired turbulence at stirring. The depth of the channels 96 can be varied depending on the desired turbulence condition and the number of channels 96 can be varied according to the desired turbulence level.

Similar to the apparatuses of the first through sixth and the eighth embodiments, the apparatus of the tenth embodiment is capable of extracting, filtering, or separating while mixing and allowing a reaction to occur. Moreover, the apparatus of the tenth embodiment is also capable of separating macromolecules while allowing a polymerization reaction to occur within a single apparatus and of separating emulsions while preparing the emulsions.

Similar to the above, the mechanisms shown in FIGS. 12 and 13 can also be employed for the tenth embodiment.

Moreover, similar to the fifth embodiment, the apparatus of the tenth embodiment can be configured to allow circulation of a heat exchange medium. Furthermore, similar to sixth and eighth embodiments, a plurality of the apparatuses of the tenth embodiment can be overlapped to form a combined apparatus.

Methods embodying the present invention will next be described.

<Method for Purifying Reactants>

A method for purifying reactants according to the present invention comprises the steps of oscillation stirring the materials to be reacted, and differentiating and collecting the product generated by the reaction via a permeable membrane while oscillation stirring.

The reaction method can be executed using the apparatus described before. For example, it is possible to let a reaction occur within the apparatus using an enzyme or a bacteria, and then differentiate and recover, from an exit, only the reaction products via a permeable membrane with a hole radius which does not let the enzyme or the bacteria permeate through.

In this manner, isolating and purifying procedure, which generally is a separate procedure following the reaction, can be performed simultaneously with the reaction in the method according to the present invention.

Figure 26:
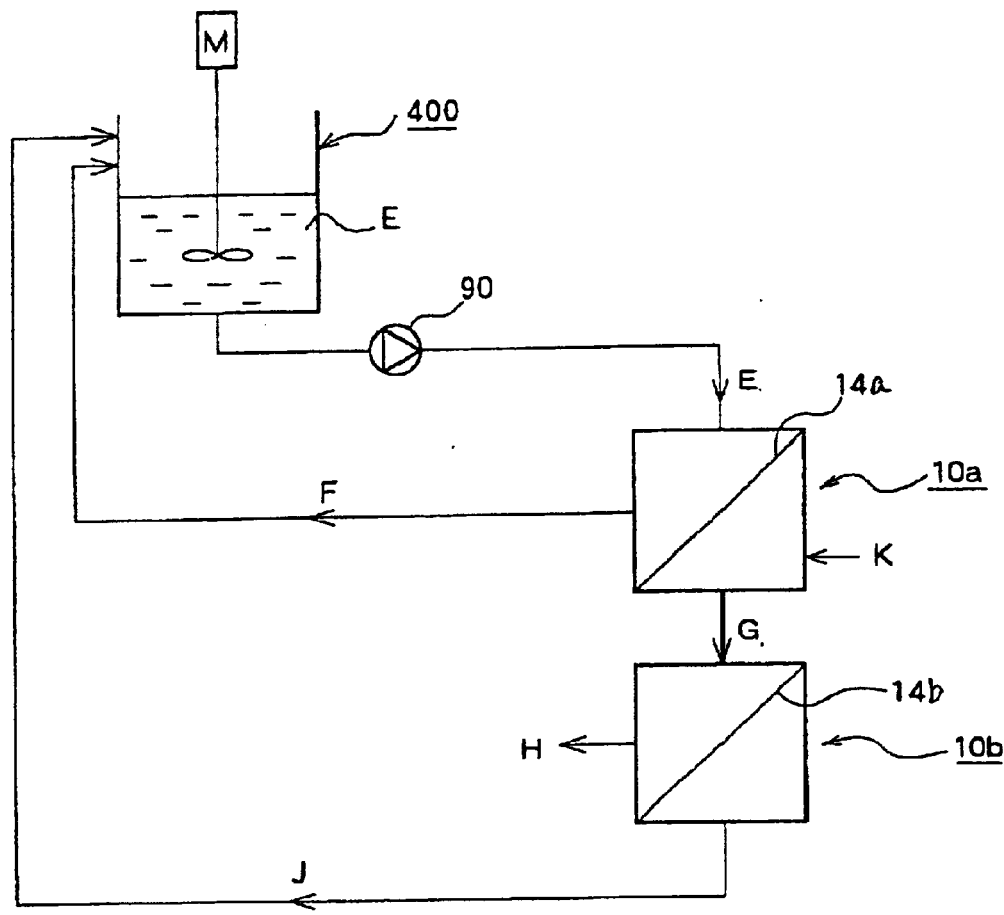
FIG. 26 is a schematic diagram showing an example structure for an apparatus used for a synthesis reaction in a method for purifying a reactant according to the present invention.
Figure 27:
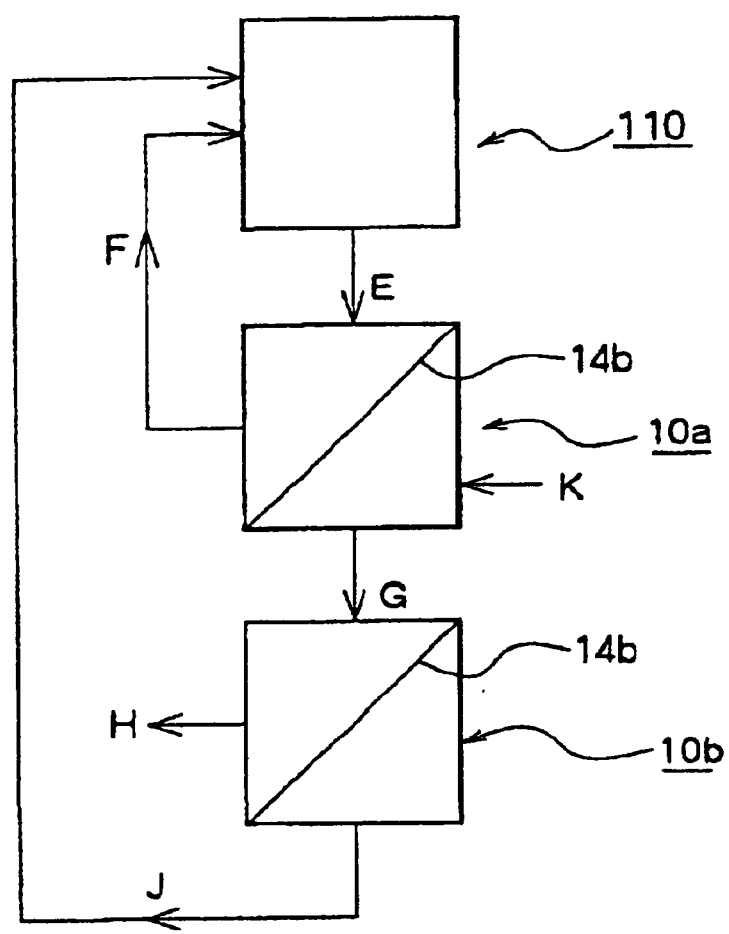
FIG. 27 is a schematic diagram showing another example structure for an apparatus used for a synthesis reaction in a method for purifying a reactant according to the present invention.

Examples of an apparatus structure which can be used in the method of synthesis reaction are shown in FIGS. 26 and 27. In the drawings, apparatuses 10a and 10b with permeable membranes 14a and 14b are represented by a quadrangle with a diagonal and a reaction and stirring apparatus 110 without a permeable membrane is represented by a quadrangle without a diagonal.

As shown in FIG. 26, in a tank 400 with a stirrer, a reaction solution E is produced by mixing a solvent, materials to be reacted, and a substrate such as an enzyme or a bacteria, and letting a reaction occur. The reaction solution E is sent to the apparatus 10a via a flow rate adjusting valve 90. In the apparatus 10a, a permeable membrane 14a is provided having a hole radius which only lets the solvent permeate through. The solvent F permeating through the permeable membrane 14a is returned to the tank 400. The mixture G of the reaction product and the substrate which could not permeate through the permeable membrane 14a, on the other hand, is sent to the apparatus 10b. At the apparatus 10b, a permeable membrane 14b is provided having a hole radius with which the substrate and the reaction product can be differentiated. The substrate and the reaction product are thus differentiated at the apparatus 10b. The differentiated substrate J is again returned to the tank 400 so that it can be supplied for another reaction. The differentiated reaction product H, on the other hand, is supplied as a final product or an intermediate product.

It is also possible to use a substrate which is constructed by fixing the enzyme on an organic particulate or on an inorganic particulate. Moreover, it is also possible to add, to the apparatus 10a, an additive K such as a pH adjusting agent and carbonic acid gas.

On the other hand, as shown in FIG. 27, it is possible to execute the synthesis reaction using a reaction and stirring apparatus 110, in place of the tank 400, having an identical structure as the apparatuses of the embodiments described above except no permeable membrane is provided.

When an optic (catalyst) reaction is performed using the apparatus described above, the material to be reacted can be introduced from the lower section, the product generated by the optic (catalyst) reaction can be taken out from the upper section of the apparatus, and unreacted materials, solvent or the like can be filtered using the permeable membrane. In this manner, reaction, filtration, and extraction can be performed with one apparatus, and the operation efficiency can be improved.

Figure 28:
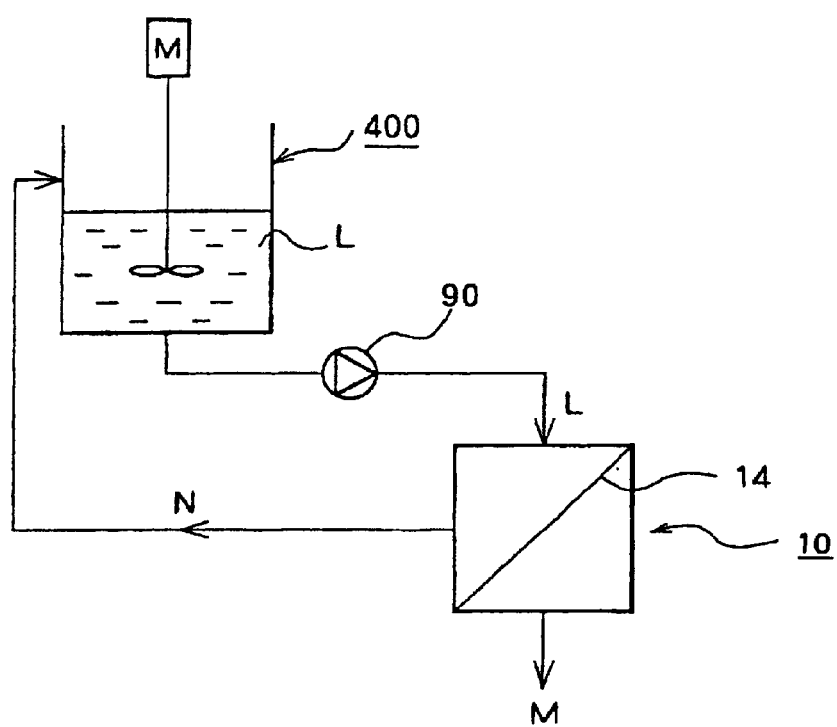
FIG. 28 is a schematic diagram showing an example structure for an apparatus used for a decomposition reaction in a method for purifying a reactant according to the present invention.
Figure 29:
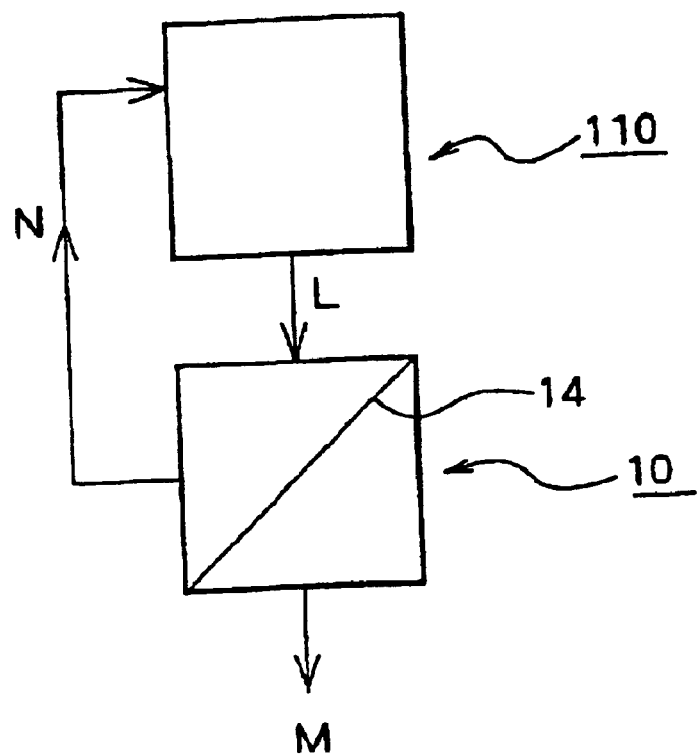
FIG. 29 is a schematic diagram showing another example structure for an apparatus used for a decomposition reaction in a method for purifying a reactant according to the present invention.

Examples of an apparatus structure for decomposition reaction is shown in FIGS. 28 and 29.

The mixture of the material to be decomposed, the substrate taking a part in the decomposition, and a solvent, are mixed and stirred within a tank 400 where the decomposition reaction occurs, and the decomposed solution L is sent to an apparatus 10 via a flow rate adjusting valve 90. The decomposed solution L is differentiated by a permeable membrane 14 of the apparatus 10 to a mixture M of the decomposed materials and the solvent, and the substrate N. The substrate N is returned again to the tank 400, and supplied to another decomposition reaction.

The decomposed material and the solvent may further be differentiated by an apparatus 10 with a permeable membrane.

As shown in FIG. 29, it is also possible to perform the decomposition reaction using a reaction stirring apparatus 110, in place of the tank 400, having a structure identical to those described above for the embodiments except no permeable membrane is provided.

<Method for Mixing and Separating Emulsion>

In a method for mixing and separating an emulsion according to the present invention, an emulsion having a radius within a predetermined range is differentiated from emulsions and collected via a permeable membrane using an apparatus of, for example, the seventh embodiment. The method for separating emulsions according to the present invention comprises the steps of oscillation stirring and mixing an oil phase and a water phase, and differentiating and collecting, via a permeable membrane, emulsions having a radius within a predetermined range from the emulsions generated by the oscillation stirring. The method can be executed using, for example, the apparatuses described above for the first through sixth and eighth embodiments.

Figure 24:
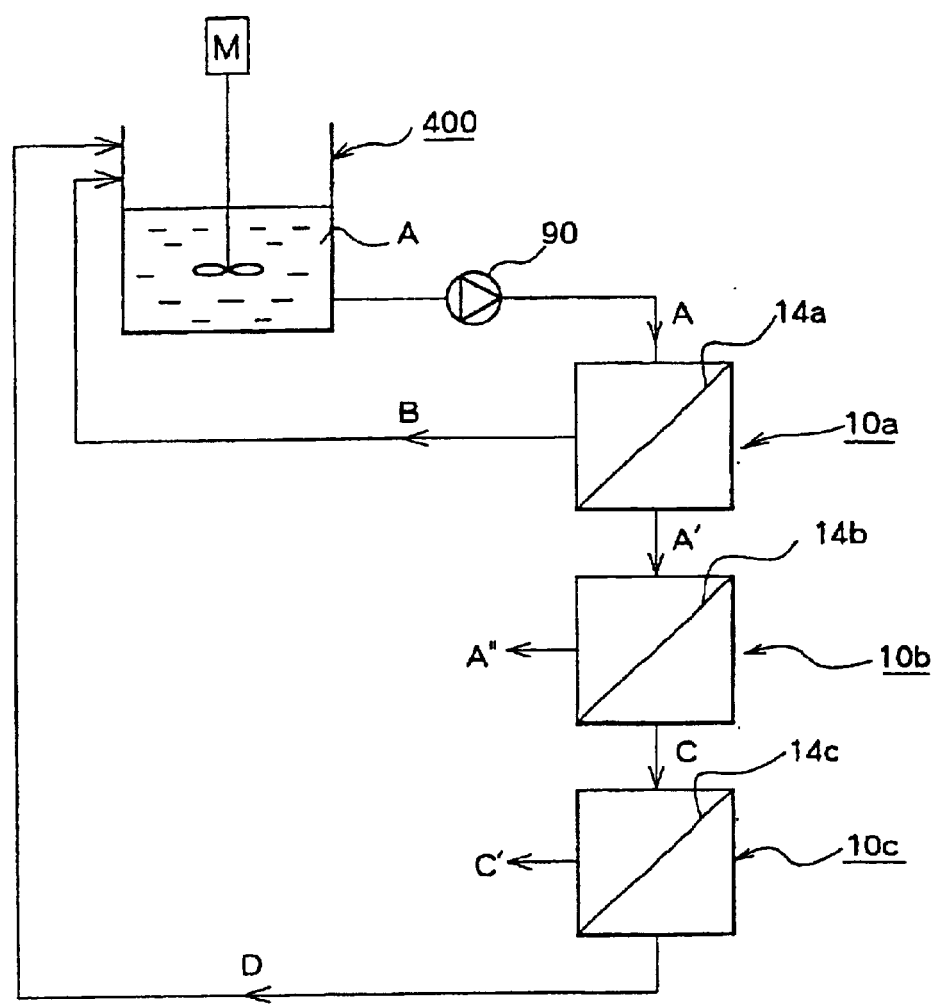
FIG. 24 is a schematic diagram showing one example of a structure of an apparatus used for a method of separating emulsion according to the present invention.

An apparatus structure for mixing and separating emulsions is shown, for example, in FIG. 24. In the drawing, apparatuses 10a, 10b, and 10c with permeable membranes 14a, 14b, and 14c are represented by a quadrangle with a diagonal. Reaction and stirring apparatuses without a permeable membrane are represented by a quadrangle without a diagonal in the drawings from FIG. 25.

The steps for separating emulsions using the apparatus of FIG. 24 will next be described with reference to FIGS. 25(a), 25(b), 25(c), and 25(d).

Figure 25A:
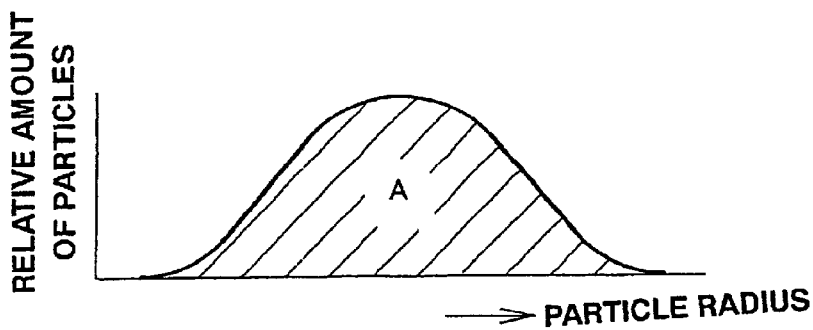
FIG. 25(*a*) is a diagram showing a particle radius distribution of an emulsion A generated at a tank 400 of FIG. 24.
Figure 25B:
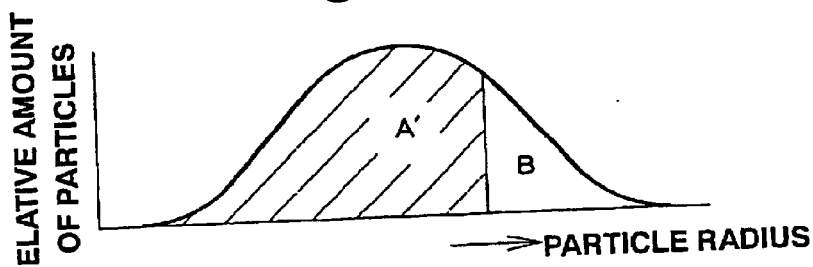
Figure 25C:
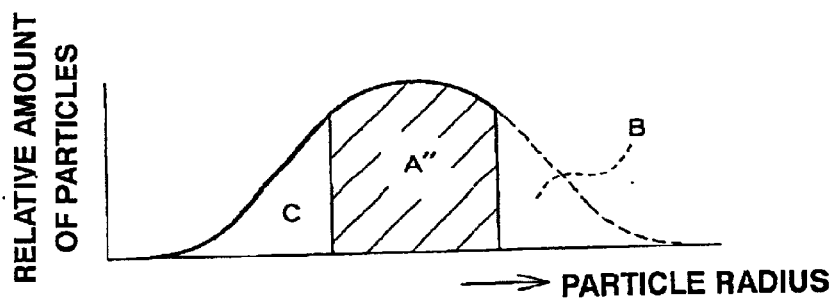
Figure 25D:
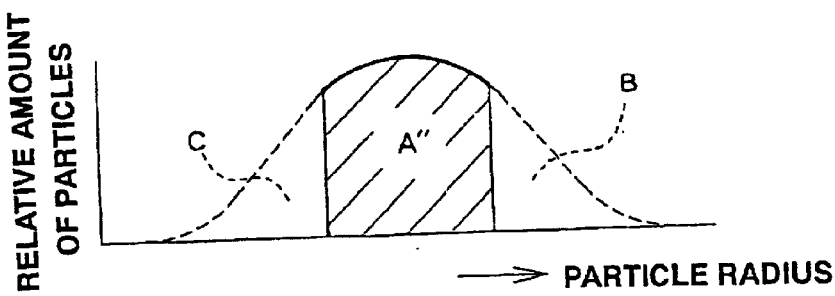

Emulsions are generated using a stirrer within a tank 400. Generated emulsion A has a particle radius distribution as shown in FIG. 25(a). The emulsion A is sent to an apparatus 10a via a flow rate adjusting valve 90. At the apparatus 10a, emulsion B having a particle radius greater than a first predetermined particle radius cannot permeate through a permeable membrane 14, and thus, is filtered and returned to the tank 400 for formation of the next emulsions. Emulsion A' having a particle radius equal to or less than the first predetermined particle radius, on the other hand, permeates through the permeable membrane 14a and is sent to an apparatus 10b (FIG. 25(b)). At the apparatus 10b, a permeable membrane 14b is provided having a second permeating hole with a radius smaller than the first permeable hole of the permeating membrane 14a. Thus, emulsion A" with a particle radius in a range between the first predetermined particle radius and a second predetermined particle radius is filtered by the permeable membrane 14b, and desired emulsion separation can be performed (FIGS. 25(c) and 25(d)). Emulsion C having a particle radius less than the second predetermined particle radius, on the other hand, is sent to an apparatus 10c. The permeable membrane 14c has a third permeating hole with a radius smaller than the second permeating hole of the permeable membrane 14b. Thus, emulsion C is differentiated into an emulsion C' and a continuous phase D at the permeable membrane 14c. The continuous phase D is sent to the tank 400 and again supplied for the next emulsion formation.

When a plurality of the apparatus structures of FIG. 24 are provided in parallel, a pump can be employed instead of the flow rate adjusting valve 90.

The method described above can also be performed using the apparatuses described above. It is possible to introduce predetermined amounts of oil phase and water phase into the apparatus, and to differentiate and collect, while forming emulsions by oscillation stirring using a stirrer, generated emulsions having a radius within a predetermined range. In this manner, a more uniform emulsion can be obtained.

<Method for Separating Particulate Material or Powdery Material>

In a method for separating a particulate material or a powdery material according to the present invention, a particulate material or a powdery material having a particle radius within a predetermined range is differentiated and collected via a permeable membrane. The apparatus structure shown in FIG. 24, for example, can be used for this method. The particulate material or the powdery material is dispersed in a solution, and the solution is stirred and stored at a tank 400. Then, by separating and filtering through apparatuses 10a, 10b, and 10c with permeable membranes provided having different permeation hole radius, the particulate material or the powdery material having a desired particle radius can be obtained.

<Method for Filtration>

A method for filtering according to the present invention is a method for filtration by a filtration membrane while oscillation stirring. This method can also be executed by any of the above mentioned apparatuses. In the method, because filtration is performed while oscillation stirring, formation of a boundary film or a cake layer near the filtration membrane can be inhibited. The "method for filtration" includes a reverse osmosis filtration method and an ultrafiltration method.

<Method for Extraction>

A method for extraction according to the present invention is a method of extracting a desired material via a permeable membrane while oscillation stirring. This method can also be realized by any of the apparatuses described before. In the method, because permeation is performed while oscillation stirring, formation of a boundary film or a cake layer near the permeable membrane can be inhibited.

Even when permeable membranes with an identical hole radius are used for filtration and extraction processes, the particle radius of the permeating material differs slightly depending on few conditions such as the temperature and pressure when the process is performed. By providing overlapping permeable membranes with different particle radii and extracting between the membranes, the permeating material having a particle radius within a desired range can be collected.

<Method for Separating Macromolecules>

A method for separating a macromolecule according to the present invention is a method for separating a macromolecule via a permeable membrane by letting a polymeric reaction occur while oscillation stirring. This method can also be realized by any of the apparatuses described above. It is possible to add a monomer which can be polymerized and polymerization initiator, if necessary, let a polymerization reaction occur by the apparatus shown in, for example, the embodiments 4, 5, 6, or 8 while heating/cooling, and permeate only the macromolecule within a predetermined molecular weight range after a predetermine period of time elapsed. In this manner, polymerization reaction and separation processes of the macromolecule can be performed at a single apparatus, and thus, operation efficiency can be increased.

Figure 30:
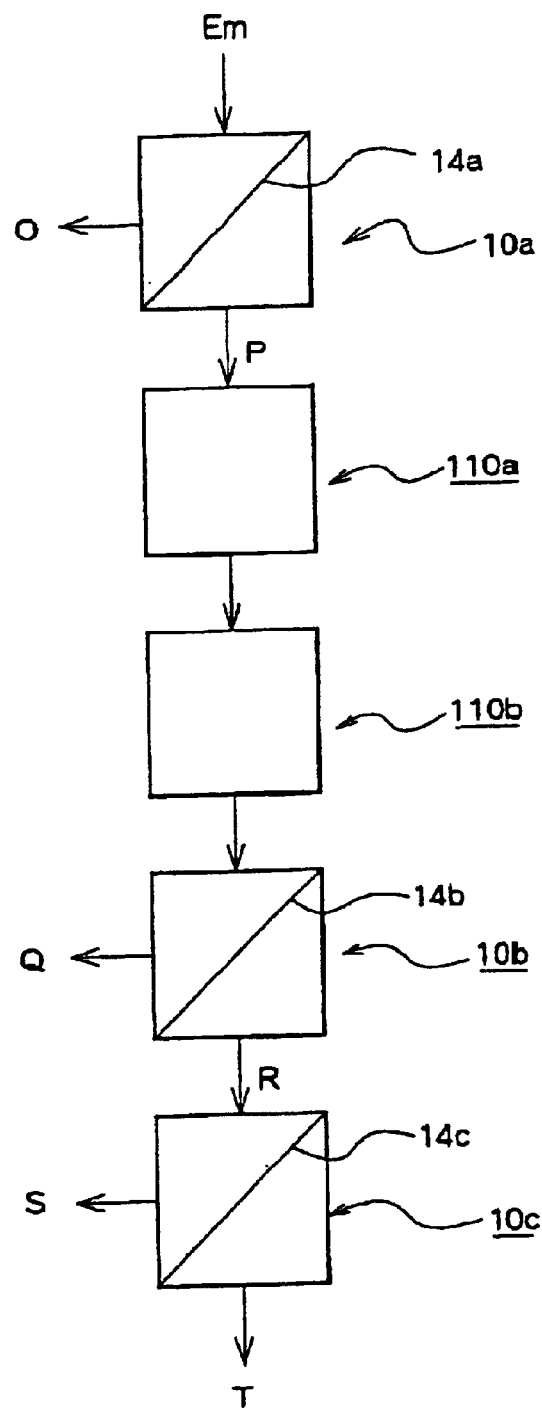
FIG. 30 is a schematic diagram showing an example structure for an apparatus used in a method for separating a macromolecule according to the present invention.
Figure 31:
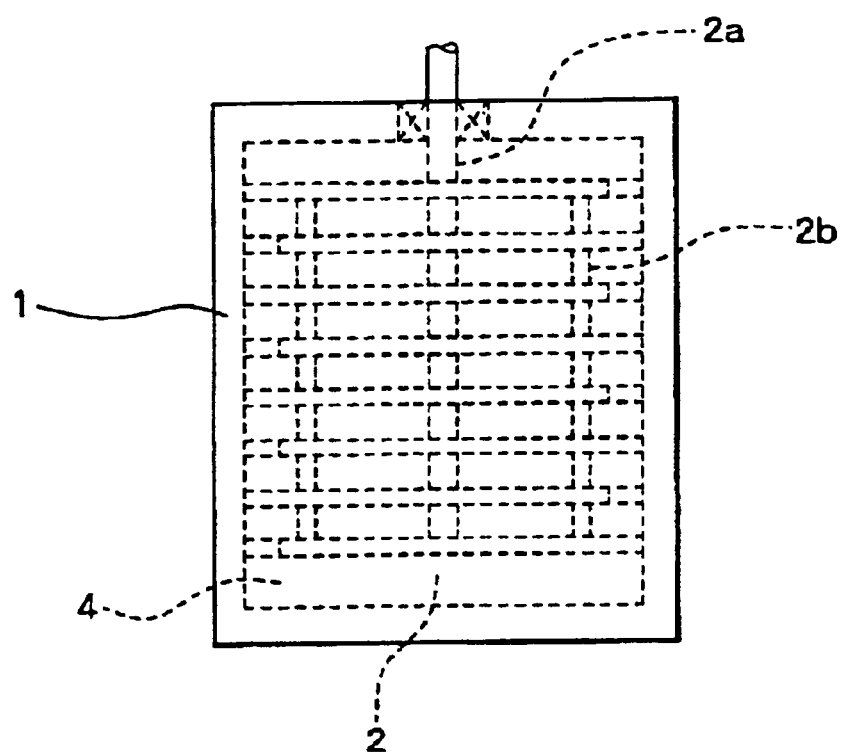
FIG. 31 is an elevational view showing a prior art filtration apparatus.
Figure 32A:
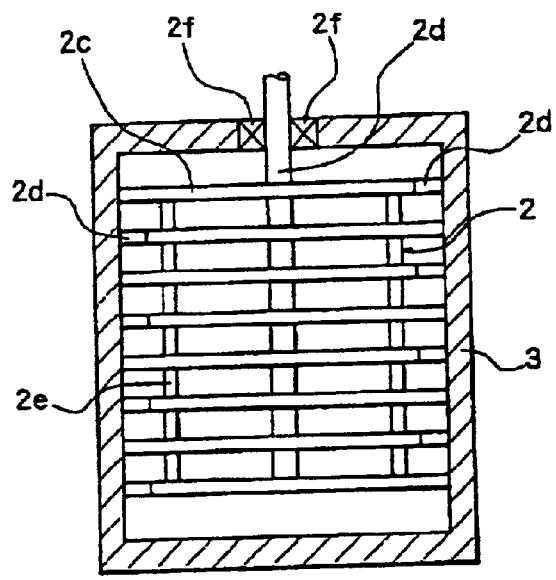
FIG. 32(a) is a sectional side view of the prior art filtration apparatus shown in FIG. 31.
Figure 32B:
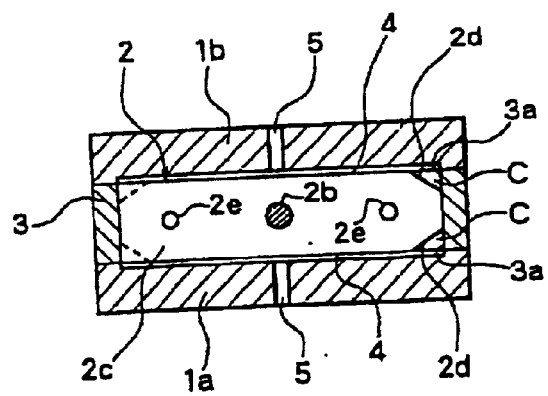
FIG. 32(b) is a horizontal cross sectional view (B) of the prior art filtration apparatus shown in FIG. 32(a).

An example of an apparatus structure used for the method of separating a macromolecule described above is shown in FIG. 30. The elements identical to those in the previous embodiments will be assigned the identical reference numerals and will not be further described here.

The apparatus can be employed for a case in which, for example, a particulate having an internal material of a reagent, an enzyme, or a bacteria is generated within a porous macromolecule compound.

The internal material, a macromolecule compound, and emulsion generating oil phase and water phase are stirred and the resulting emulsion Em is sent to an apparatus 10a. At the apparatus 10a, the emulsion Em is differentiated into an emulsion P and a solution O. The particulate having the internal material within the differentiated emulsion P is then stirred at reaction and stirring apparatuses 110a and 110b, so that the macromolecule compound forming the outer shell of the particulate with an internal material is cured, to generate a porous particulate. Then, the porous particulate and the solution generated during this production of porous particulate can be solid-liquid isolated by a permeable membrane 14b at an apparatus 10b, to yield a porous particulate Q with an internal material as a product. The solution R, on the other hand, is further sent to an apparatus 10c, where it is liquid-liquid isolated into an oil phase S and a water phase T.

In order to promote curing of the macromolecule compound, light, a polymerization initiator, or a bridging agent may be suitably added into the reaction and stirring apparatuses 110a and 110b. The apparatus 10c can further be a liquid-liquid isolating apparatus for isolating solutions with different characteristics.

The "macromolecule compound" in this embodiment includes a material constructed from a polymeric monomer, a natural macromolecule compound, and an inorganic macromolecule compound such as a water glass.

Because the particulate or particles obtained using the apparatus described above and the method using the apparatus, have approximately uniform radius, these materials can preferably be used as, for example, toner for a printer or for a copier, pigment or capsule for cosmetics, or raw material for a medicine.

As described, according to the reaction and separating filtration apparatus and the method for using the apparatus of the present invention, because separating filtration are performed while oscillation stirring, formation of a boundary film and a cake layer near the permeable membrane can be inhibited, and reduction in the permeation resistance by the boundary films can be minimized, resulting in more efficient separation, filtration, and extraction.

What is claimed is:

1. A reaction and stirring apparatus comprising:
   a pair of impermeable supports;
   a pair of spacer members engaging the end sections of said pair of impermeable supports for providing a predetermined distance between said pair of impermeable supports; and
   a stirrer provided within a space defined by said pair of impermeable supports and said pair of spacer members; wherein,
   said stirrer includes:
   a stirring axis;
   a driving source for oscillating said stirring axis; and
   a plurality of stirring blades mounted on said stirring axis.

2. A reaction and stirring apparatus of claim 1, wherein,
   a cut section is provided at a portion of each of said stirring blades such that an object can be circulated at the space between said stirring blade and the inner wall of said spacer member and/or at the space between said stirring blade and the inner wall of said impermeable support.

3. A reaction and stirring apparatus of claim 1, wherein,
   a circulation path through which a heat exchange medium can be circulated is provided on at least one of the outer walls of said impermeable supports and spacer members.

4. A reaction and stirring apparatus of claim 2, wherein,
   a circulation path through which a heat exchange medium can be circulated is provided on at least one of the outer walls of said impermeable supports and spacer members.

5. A reaction and stirring apparatus of claim 2, wherein,
   said cut sections are one or more holes alternately provided on the right and left ends of each of said stirring blades so that said permeating object can be circulated between said stirring blades and said inner wall of spacer member.

6. A reaction and stirring apparatus of claim 2, wherein,
   said cut sections are alternately provided at the front and rear ends of each of said stirring blades so that said permeating object can be circulated between said stirring blade and inner wall of said impermeable support.

7. A reaction and stirring apparatus of claim 1, wherein,
   a plurality of barriers are provided on and protruding from said spacer member, said barriers and said stirring blade being alternately placed, and
   a gap is provided such that said permeating object can be circulated, said gap defined by said stirring blade, said barrier, and the inner wall of said spacer member.

8. A reaction and stirring apparatus of claim 1, wherein,
   at least one inlet and one outlet are provided at the top and bottom of said reaction and stirring apparatus, for respectively introducing a material into said space and retrieving a material from said space; and
   at least one hole is provided on said spacer member for introducing or retrieving a material.

9. A reaction and separating filtration apparatus, comprising:
   a pair of impermeable supports;

a pair of spacer members engaging the end sections of said pair of impermeable supports, for providing a predetermined distance between said pair of impermeable supports;

a permeable membrane provided within a space defined by said pair of impermeable supports and said pair of spacer members;

an outlet provided on at least one of said impermeable members, to connect said space with outside for letting permeated material that has permeated through said permeable membrane flow out; and a stirrer provided within said space on the permeating object side of said permeable membrane; wherein, said stirrer includes:

a stirring axis;

a driving source for oscillating said stirring axis; and a plurality of stirring blades mounted on said stirring axis.

10. A reaction and separating filtration apparatus of claim 9, wherein, a cut section is provided on a portion of each of said stirring blades such that said permeating object can be circulated at the space between said stirring blades and inner wall of said spacer member, the space between said stirring blades and inner wall of said impermeable support, and/or the space between said stirring blades and said permeable membrane, and said cut sections are one or more holes alternately provided on the right and left ends of each of said stirring blades so that said permeating object can be circulated between said stirring blades and inner wall of said spacer member.

11. A reaction and separating filtration apparatus of claim 9, wherein, a cut section is provided on a portion of each of said stirring blades such that said permeating object can be circulated at the space between said stirring blades and inner wall of said spacer member, the space between said stirring blades and inner wall of said impermeable support, and/or the space between said stirring blades and said permeable membrane, and said cut sections are alternately provided on the front and rear ends of each of said stirring blades so that said permeating object can be circulated between said stirring blades and inner wall of said impermeable support.

12. A reaction and separating filtration apparatus of claim 9, wherein, a plurality of barriers are provided on and protruding from said spacer member, said barriers and said stirring blades being alternately placed, and a gap is provided such that said permeating object can be circulated, said gap defined by said stirring blade, said barrier, and inner wall of said spacer member.

13. A reaction and separating filtration apparatus of claim 9, wherein, a circulation path through which a heat exchange medium can be circulated is provided on at least one of the outer walls of said impermeable supports and said spacer members.

14. A reaction and separating filtration apparatus, comprising at least two reaction and separating filtration apparatuses of claim 9 provided in parallel.

15. A reaction and separating filtration apparatus of claim 14, wherein, a circulation path in which a heat exchange medium can be circulated is provided between adjacent reaction and separating filtration apparatuses.

16. A reaction and separating filtration apparatus of claim 9, wherein, at least one inlet and one outlet are provided at the top and bottom of said reaction and stirring apparatus for respectively introducing a material into said space and retrieving a material from said space; and at least one introduction hole is provided on said spacer member for insertion or retrieval of a material.

17. A method for purifying a reactant, comprising the steps of, oscillation stirring materials to be reacted, and while oscillation stirring, differentiating and collecting the product via a permeable membrane, said product generated by the reaction.

18. A method for mixing and separating an emulsion comprising the step of differentiating and collecting, via a permeable membrane, an emulsion having a particle radius within a predetermined range, from the emulsions.

19. A method for mixing and separating an emulsion comprising the steps of, oscillation stirring and mixing an oil phase and a water phase, and while oscillation stirring, differentiating and collecting, via a permeable membrane, an emulsion having a particle radius within a predetermined range from generated emulsions.

20. A method for separating a particulate material or a powdery material, comprising the step of differentiating and collecting, via a permeable membrane, a particulate material or a powdery material having a particle radius within a predetermined range, from the particulate materials and powdery materials.

21. A method for filtering and extracting, wherein the filtration and extraction are performed via a permeable membrane while oscillation stirring.

22. A method for separating a macromolecule, comprising the steps of allowing a polymerization reaction to occur while oscillation stirring, and separating a macromolecule via a permeable membrane.

23. A reactant purification method of claim 17, wherein said reaction purification is performed using an apparatus, wherein the apparatus is a reaction and separating filtration apparatus, comprising:

a pair of impermeable supports;

a pair of spacer members engaging the end sections of said pair of impermeable support, for providing a predetermined distance between said pair of impermeable supports;

a permeable membrane provided within a space defined by said pair of impermeable supports and said pair of spacer members;

an outlet provided on at least one of said impermeable members, to connect said space with outside for letting permeated material that has permeated through said permeable membrane flow out; and a stirrer provided within said space on the permeating object side of said permeable membrane; wherein, said stirrer includes:

a stirring axis;

a driving source for oscillating said stirring axis; and a plurality of stirring blades mounted on said stirring axis.

24. An emulsion mixing and separating method of claim 18, wherein mixing and separation are performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:
- a stirring axis;
- a driving source for oscillating said stirring axis; and
- a plurality of stirring blades mounted on said stirring axis.

25. An emulsion mixing and separating method of claim 19, wherein mixing and separation are performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:
- a stirring axis;
- a driving source for oscillating said stirring axis; and
- a plurality of stirring blades mounted on said stirring axis.

26. A separating method of particulate material or powdery material of claim 20, wherein the separation of a particulate material or a powdery material is performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:
- a stirring axis;
- a driving source for oscillating said stirring axis; and
- a plurality of stirring blades mounted on said stirring axis.

27. A filtration and extraction method of claim 21, wherein filtration and extraction are performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:
- a stirring axis;
- a driving source for oscillating said stirring axis; and
- a plurality of stirring blades mounted on said stirring axis.

28. A macromolecule separation method of claim 22, wherein the macromolecule separation is performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:
- a stirring axis;
- a driving source for oscillating said stirring axis; and
- a plurality of stirring blades mounted on said stirring axis.

29. A method for reverse osmosis filtration, wherein the reverse osmosis filtration is performed using an apparatus, wherein the apparatus is a reaction and separating filtration apparatus, comprising:
- a pair of impermeable supports;
- a pair of spacer members engaging the end sections of said pair of impermeable support, for providing a predetermined distance between said pair of impermeable supports;
- a permeable membrane provided within a space defined by said pair of impermeable supports and said pair of spacer members;
- an outlet provided on at least one of said impermeable members, to connect said space with outside for letting permeated material that has permeated through said permeable membrane flow out; and
- a stirrer provided within said space on the permeating object side of said permeable membrane; wherein, said stirrer includes:

a stirring axis;

a driving source for oscillating said stirring axis; and a plurality of stirring blades mounted on said stirring axis.

30. A method for ultrafiltration, wherein the ultrafiltration is performed using an apparatus of claim 9.

31. A reaction and stirring apparatus of claim 1, wherein, said stirring blades are vertical fins integrated into said stirring axis and provided in parallel with said impermeable supports; and irregularities are formed on the surfaces of said stirring blades.

32. A reaction and stirring apparatus of claim 1, wherein, said stirring blades are provided in parallel with said impermeable supports and are a pair of vertical fins provided on both sides of said stirring axis in the radial direction; and irregularities are formed on the surfaces of said stirring blades.

33. A reaction and separating filtration apparatus of claim 9, wherein, said stirring blades are vertical fins integrated into said stirring axis and provided in parallel with said impermeable supports; and irregularities are formed on the surfaces of said stirring blades.

34. A reaction and separating filtration apparatus of claim 9, wherein said stirring blades are provided in parallel with said impermeable supports and are a pair of vertical fins provided on both sides of said stirring axis in the radial direction; and irregularities are formed on the surfaces of said stirring blades.

35. A reaction and stirring apparatus of claim 1, wherein at least one channel is formed on the side surface of each of said stirring blades which faces said impermeable supports.

36. A reaction and separating filtration apparatus of claim 9, wherein at least one channel is formed on the side surface of each of said stirring blades which faces said impermeable supports.

* * * * *